United States Patent
Zhao et al.

(10) Patent No.: US 12,549,759 B2
(45) Date of Patent: Feb. 10, 2026

(54) MOTION COMPENSATED PICTURE BOUNDARY PADDING

(71) Applicant: TENCENT AMERICA LLC, Palo Alto, CA (US)

(72) Inventors: Liang Zhao, Sunnyvale, CA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 70 days.

(21) Appl. No.: 18/497,748

(22) Filed: Oct. 30, 2023

(65) Prior Publication Data

US 2024/0314348 A1    Sep. 19, 2024

Related U.S. Application Data

(60) Provisional application No. 63/452,651, filed on Mar. 16, 2023.

(51) Int. Cl.
*H04N 19/517* (2014.01)
*H04N 19/105* (2014.01)
*H04N 19/137* (2014.01)
*H04N 19/176* (2014.01)

(52) U.S. Cl.
CPC ......... *H04N 19/517* (2014.11); *H04N 19/105* (2014.11); *H04N 19/137* (2014.11); *H04N 19/176* (2014.11)

(58) Field of Classification Search
CPC .............................. H04N 19/157; H04N 19/105
See application file for complete search history.

(56) References Cited

U.S. PATENT DOCUMENTS

| | | | | |
|---|---|---|---|---|
| 10,021,414 B2 * | 7/2018 | Seregin | ................... | H04N 19/52 |
| 10,701,391 B2 * | 6/2020 | Seregin | ................... | H04N 19/52 |
| 12,219,150 B2 * | 2/2025 | Yasugi | ................. | H04N 19/573 |
| 12,432,378 B2 * | 9/2025 | Zhao | .................... | H04N 19/167 |
| 2012/0307902 A1 * | 12/2012 | Sugio | .................... | H04N 19/56 |
| | | | | 375/E7.263 |
| 2016/0134857 A1 * | 5/2016 | An | ......................... | H04N 19/44 |
| | | | | 348/43 |
| 2019/0082193 A1 * | 3/2019 | Sun | ........................ | H04N 19/82 |
| 2019/0387251 A1 * | 12/2019 | Lin | ...................... | H04N 19/105 |
| 2021/0321111 A1 * | 10/2021 | Tamse | ................... | H04N 19/137 |
| 2022/0086433 A1 * | 3/2022 | Zhang | .................... | H04N 19/70 |

(Continued)

OTHER PUBLICATIONS

International Search Report and Written Opinion issued in PCT application PCT/US23/36414, dated Feb. 16, 2024, 7 pages.

(Continued)

*Primary Examiner* — Irfan Habib
(74) *Attorney, Agent, or Firm* — Crowell & Moring LLP

(57) ABSTRACT

This disclosure relates generally to video coding and particularly to methods and systems for boundary padding for motion compensation. For example, a motion vector for a motion compensation padded block in a motion compensation padding area of a picture in a video may be determined from scanning a set of neighboring boundary blocks of the picture and/or a set of co-located temporal blocks of the boundary blocks. The motion compensation padded block may be padded according to the motion vector and used for motion compensation of other pictures in the video.

19 Claims, 15 Drawing Sheets

(56) References Cited

U.S. PATENT DOCUMENTS

2022/0094966 A1* 3/2022 Chuang ............... H04N 19/533
2022/0103827 A1* 3/2022 Liu ..................... H04N 19/159
2023/0328257 A1* 10/2023 Zhang ................. H04N 19/182
2023/0396777 A1* 12/2023 Deng .................. H04N 19/513

OTHER PUBLICATIONS

J. Chen et al.; "Algorithm description for Versatile Video Coding and Test Model 10 (VTM 10)"; JVET-S2002, ITU-TSG 16 WP 3 and ISO/IEC JTC 1/SC 29/WG 11, Jul. 2020; pp. 1-97.

M. Coban et al.; "Algorithm description of Enhanced Compression Model 4 (ECM 4)"; JVET-Y2025-V2, Joint Video Experts Team (JVET) of ITU-T SG 16 WP 3 and ISO/IEC JTC 1/80 29, 23rd Meeting, by teleconference, Jul. 7-16, 2021; pp. 1-32.

* cited by examiner

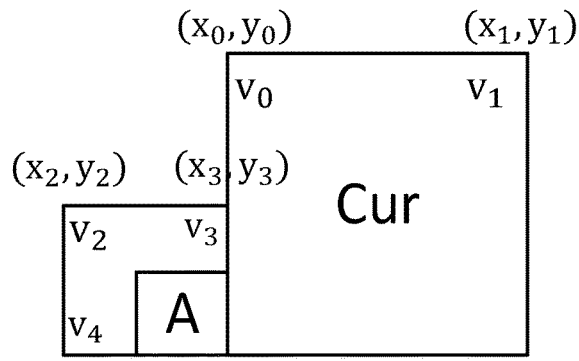
*FIG. 13*
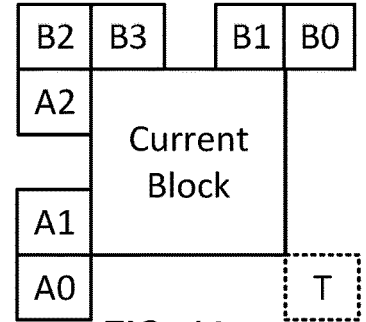
*FIG. 14*
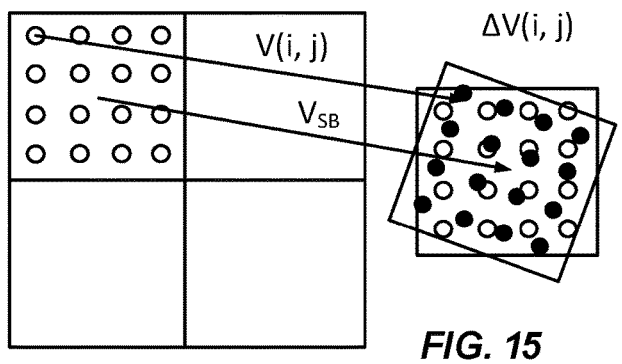
*FIG. 15*
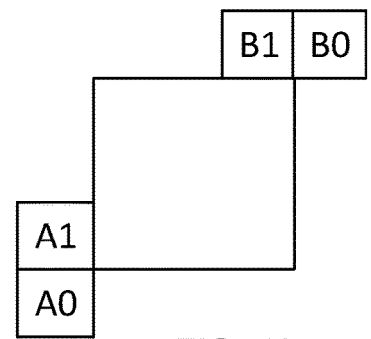
*FIG. 16*
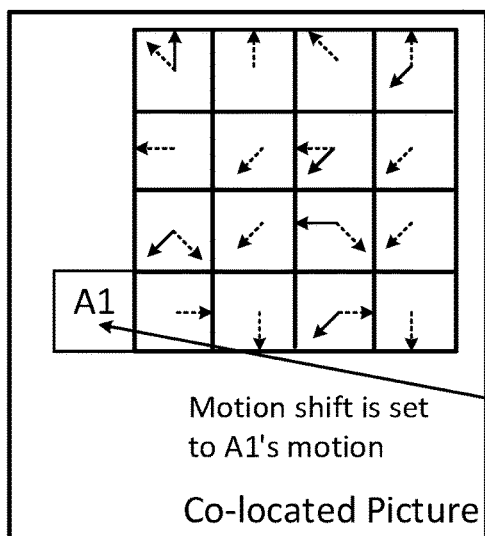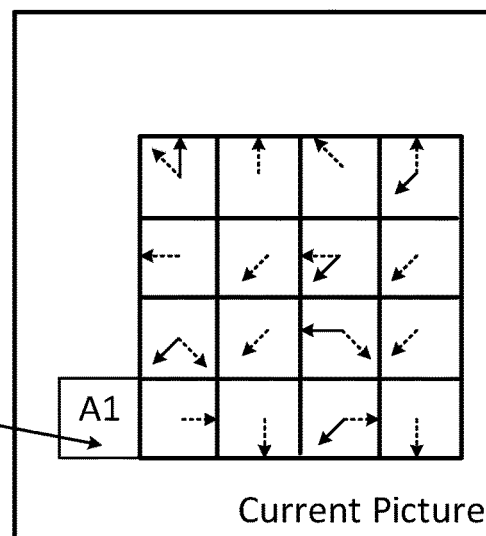
→ MV_L1 from co-located block  → MV_L1 for current block (after scaling)
┄┄▸ MV_L0 from co-located block  ┄┄▸ MV_L0 for current block (after scaling)
*FIG. 17*

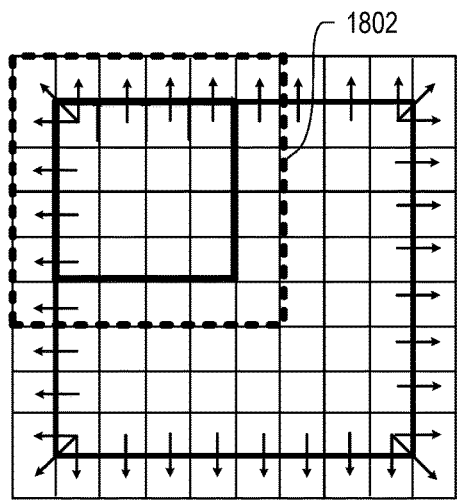
FIG. 18
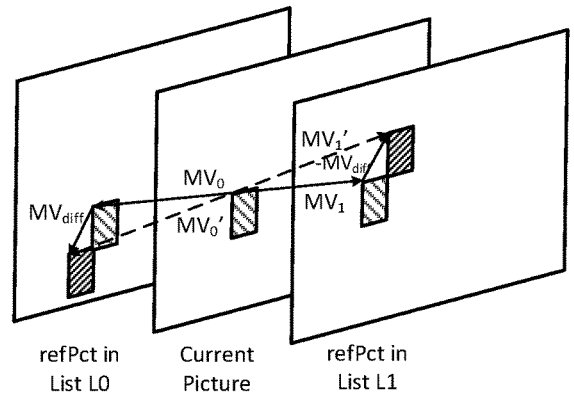
FIG. 19
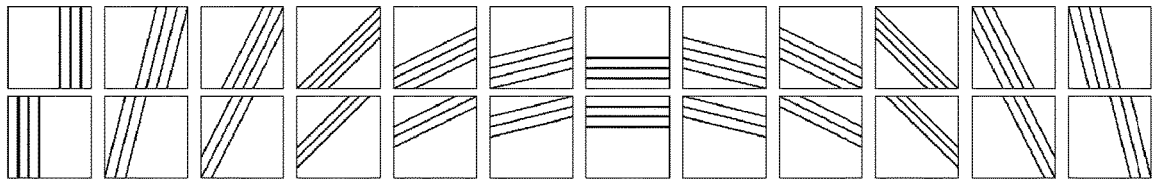
FIG. 20
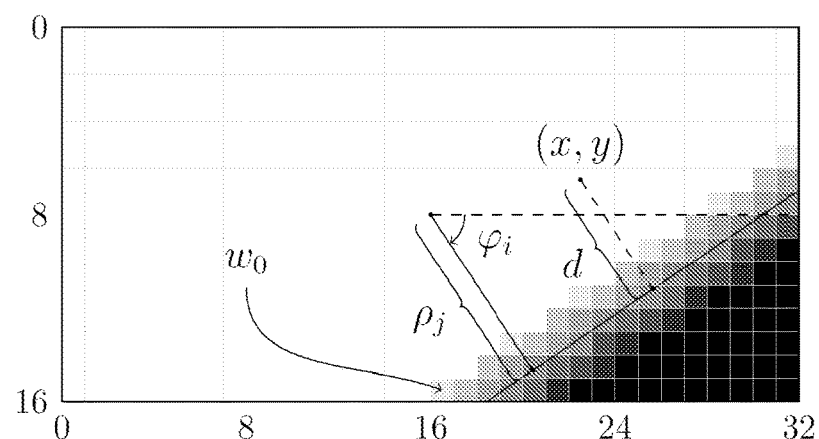
FIG. 21
FIG. 22

Current Block

MOTION COMPENSATED PICTURE BOUNDARY PADDING

INCORPORATION BY REFERENCE

The present application is based on and claims the benefit of priority to U.S. Provisional Application No. 63/452,651, titled "On Motion Compensated Picture Boundary Padding" filed on Mar. 16, 2023. The entire disclosures of the prior applications are hereby incorporated by reference in their entirety.

TECHNICAL FIELD

This disclosure relates generally to video coding and particularly to methods and systems for boundary padding for motion compensation.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

This disclosure relates generally to video coding and particularly to methods and systems for boundary padding for motion compensation. For example, a motion vector for a motion compensation padded block in a motion compensation padding area of a picture in a video may be determined from scanning a set of neighboring boundary blocks of the picture and/or a set of co-located temporal blocks of the boundary blocks. The motion compensation padded block may be padded according to the motion vector and used for motion compensation of other pictures in the video.

In an example implementation, a method for encoding a first picture of a video based on a second picture of the video in a bitstream is disclosed. The method may include determining a motion compensation padding (MCP) block within an MCP area surrounding picture boundaries of the second picture; selecting a candidate block from a plurality of candidate blocks that are temporal blocks or spatial neighboring block of the MCP block at the picture boundaries of the second picture; deriving a motion vector from the selected candidate block for the MCP block, pointing to a reference block in a reference frame of the second picture; padding the MCP block with pixel values according to the reference block; and using the second picture as an inter prediction reference frame of the first picture and using the MCP block in the second picture for motion compensation for encoding the first picture in the bitstream.

In another example implementation, a method for encoding a first picture of a video based on a second picture of the video in a bitstream is disclosed. The method may include determining a motion compensation padding (MCP) area surrounding picture boundaries of the second picture; identifying an MCP block within the MCP area; determining motion information of a set of inter minimal blocks at the picture boundaries of the second picture; determining a motion vector for the MCP block according to the motion information; padding the MCP block with pixel values according to the motion vector; and using the second picture as an inter prediction reference frame of the first picture and using the MCP block for motion compensation for inter encoding the first picture in the bitstream.

In any one of the example implementations above, the plurality of candidate blocks comprise N1 spatially neighboring blocks and N2 temporal blocks of the MCP block, N1 and N2 being positive integers.

In any one of the example implementations above, the N2 temporal blocks comprise N2 temporal subblocks located at N2 predefined positions in the reference frame relative to the MCP block. In some example implementations. N2=2, and the N2 temporal subblocks in the reference frame are co-located with a center subblock and a bottom-right subblock of the MCP block of the second picture. In some example implementations, the N1 spatially neighboring blocks are scanned before scanning the N2 temporal blocks in order to derive the motion vector for the MCP block of the second picture.

In any one of the example implementations above, deriving the motion vector for the MCP block comprises identifying a first candidate block having available motion vector from the plurality of candidate blocks.

In any one of the example implementations above the MCP area corresponds to a plurality of rectangles each extended from one of the picture boundaries of the second picture going outwards in units of pixels by an MCP range in a predetermined number of pixels.

In any one of the example implementations above, an entirety or a subset of the plurality of candidate blocks comprise a set of neighboring blocks of the MCP block in the second picture at a corresponding boundary of the second picture and wherein each of the set of neighboring blocks is of a predetermined block size and the set of neighboring blocks correspond to predetermined relative positions with respect to the MCP block in the second picture. In some example implementations, deriving the motion vector for the MCP block comprises identifying a first candidate block having available motion vector from the plurality of candidate blocks according to a predetermined scanning order. In some example implementations, an entirety or a subset of the plurality of candidate blocks further comprise one or more blocks in the reference frame of the second picture that are temporally co-located with a boundary block in the second picture corresponding to the MCP block. In some example implementations, the one or more blocks in the reference frame of the second picture that are temporally co-located with the boundary block in the second picture corresponding to the MCP block comprise one or more sub-blocks of the boundary block at a predefined set of locations within the boundary block relative to a middle sub-block of the boundary block.

In any one of the example implementations above, deriving the motion vector for the MCP block comprises identifying a first candidate block having available motion vector from the plurality of candidate blocks according to a predetermined scanning order, and wherein the set of neighboring blocks are scanned first followed by the one or more blocks that are temporally co-located with the boundary block in the second picture corresponding to the MCP block until the candidate block is identified.

In any one of the example implementations above, the method may further include signaling the selection of the candidate block from the plurality of candidate blocks in the bitstream.

In any one of the example implementations above, one bin of candidate index is used to signal a selection of one of first two candidate blocks of the plurality of candidate blocks.

In any one of the example implementations above, a variable length coding is used to signal one of three available candidate blocks of the plurality of candidate blocks.

In any one of the example implementations above, when there is only one candidate block among the plurality of candidate blocks with available motion vector, the selection of the candidate block is implicit and is not signaled in the bitstream.

In any one of the example implementations above, signaling of candidate block selection for all MCP blocks of the second picture is aggregated in a predetermined MCP block scanning order.

In any one of the example implementations above, the method may further include determining an offset based on first DC values of the selected candidate block and second DC values of a reference block in the reference frame for the candidate block; and applying the offset when padding the MCP block.

Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

BRIEF DESCRIPTION OF THE DRAWINGS

Further features, the nature, and various advantages of the disclosed subject matter will be more apparent from the following detailed description and the accompanying drawings in which:

FIG. 13 shows control point motion vectors in some examples.

FIG. 14 shows spatial neighbors and a temporal neighbor in some examples.

FIG. 15 shows an exemplary illustration of the difference between the sample motion vector and the subblock motion vector.

FIGS. 16-17 show an exemplary subblock-based temporal motion vector prediction (SbTMVP) process used in the SbTMVP mode.

FIG. 18 shows extended coding unit region in some examples.

FIG. 19 shows an exemplary schematic view of a decoder side motion vector refinement in some examples.

FIG. 20 shows examples of splitting lines for geometric partitioning mode in some examples.

FIG. 21 shows a diagram for uni-prediction motion vector selection for the geometric partition mode in some examples.

FIG. 22 shows a diagram illustrating generation of a blending weigh in the geometric partitioning mode in some examples.

FIG. 22 shows a portion of video coding standard in some examples.

FIG. 23 shows a diagram illustrating sub block level bi-prediction constraint in some examples.

FIG. 26 shows a diagram that illustrates an example of deriving motion information for motion compensation padding blocks in some examples.

DETAILED DESCRIPTION OF EMBODIMENTS

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of context-dependent meanings. Typically, "or" if used to associate a list, such as A, B or C, is intended to mean A, B, and C, here used in the inclusive sense, as well as A, B or C, here used in the exclusive sense. In addition, the term "one or more", "at least one", "a", "an", or "the" as used herein, depending at least in part upon context, may be used in a singular sense or plural sense. In addition, the term "based on" or "determined by" may be understood as not necessarily intended to convey an exclusive set of factors and may, instead, allow for existence of additional factors not necessarily expressly described, again, depending at least in part on context.

Figure 1:
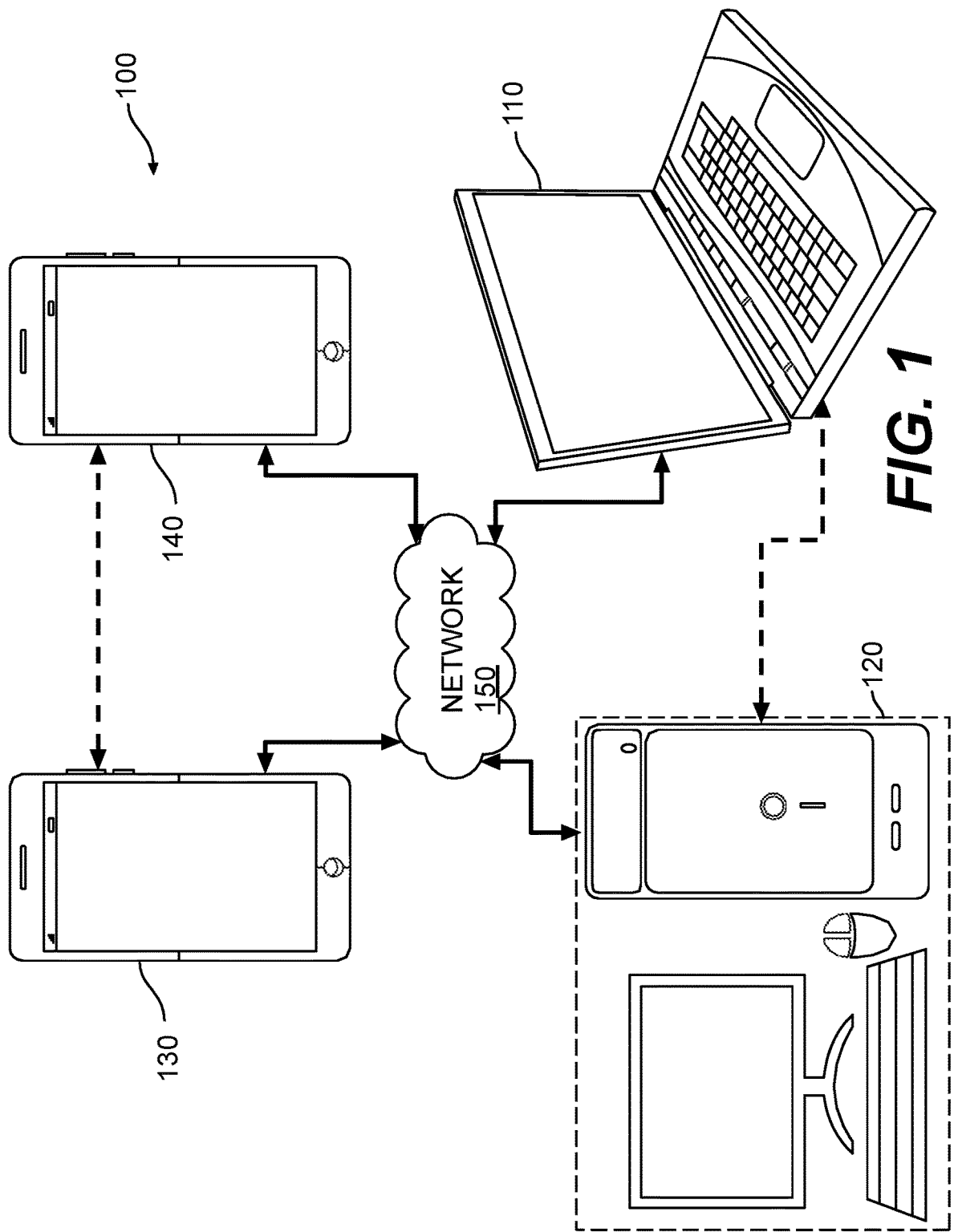
FIG. 1 shows a schematic illustration of a simplified block diagram of a communication system (100) in accordance with an example embodiment.

FIG. 1 illustrates a simplified block diagram of a communication system (100) according to an embodiment of the present disclosure. The communication system (100) includes a plurality of terminal devices, e.g., 110, 120, 130, and 140 that can communicate with each other, via, for example, a network (150). In the example of FIG. 1, the first pair of terminal devices (110) and (120) may perform unidirectional transmission of data. For example, the terminal device (110) may code video data in the form of one or more coded bitstreams (e.g., of a stream of video pictures that are captured by the terminal device (110)) for transmission via the network (150). The terminal device (120) may receive the coded video data from the network (150), decode the coded video data to recover the video pictures and display the video pictures according to the recovered video data. Unidirectional data transmission may be implemented in media serving applications and the like.

In another example, the second pair of terminal devices (130) and (140) may perform bidirectional transmission of coded video data, for example, during a videoconferencing application. For bidirectional transmission of data, in an example, each of the terminal devices (130) and (140) may code video data (e.g., of a stream of video pictures that are captured by the terminal device) for transmission to and may also receive coded video data from another of the terminal devices (130) and (140) to recover and display the video pictures.

In the example of FIG. 1, the terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
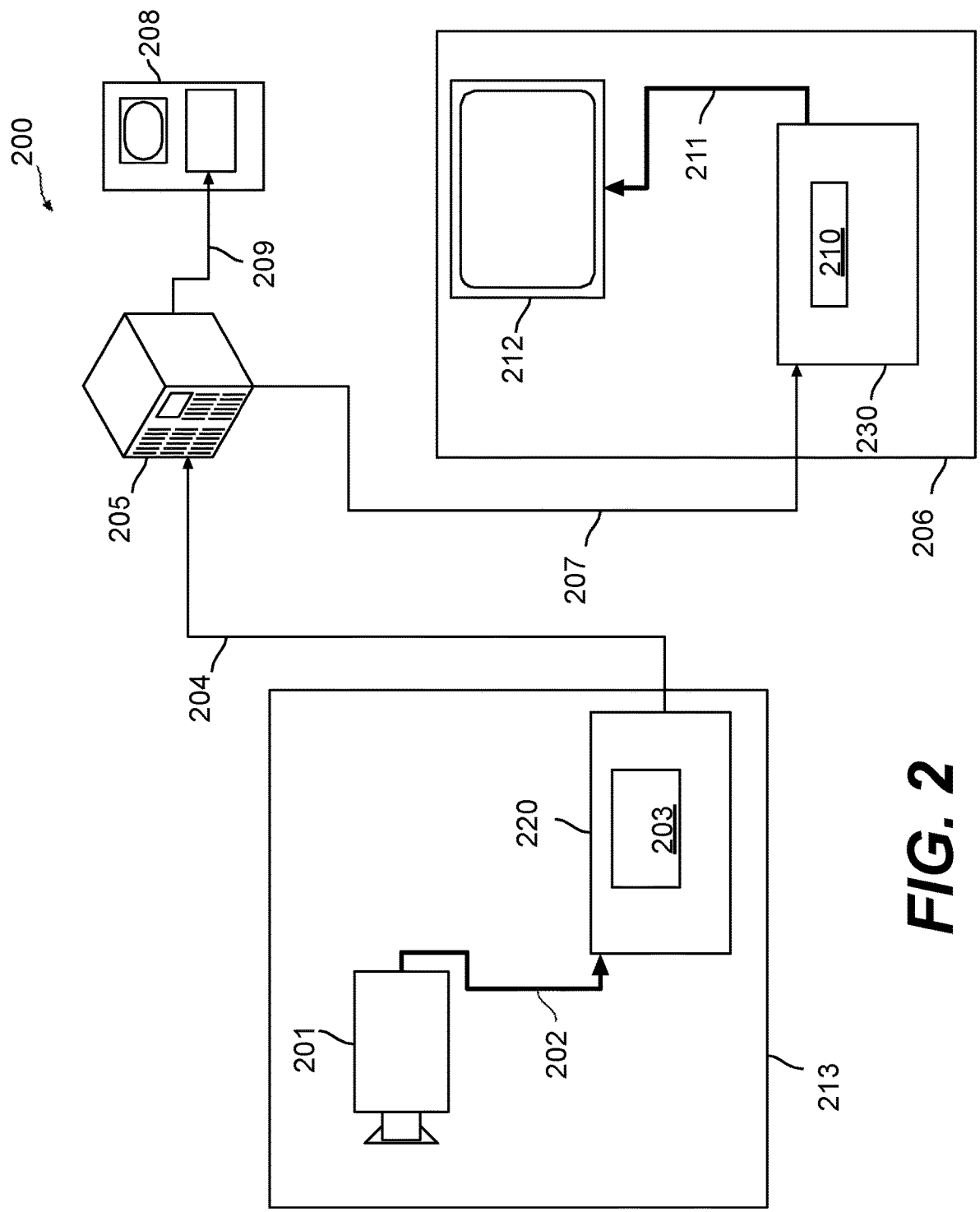
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source 201. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
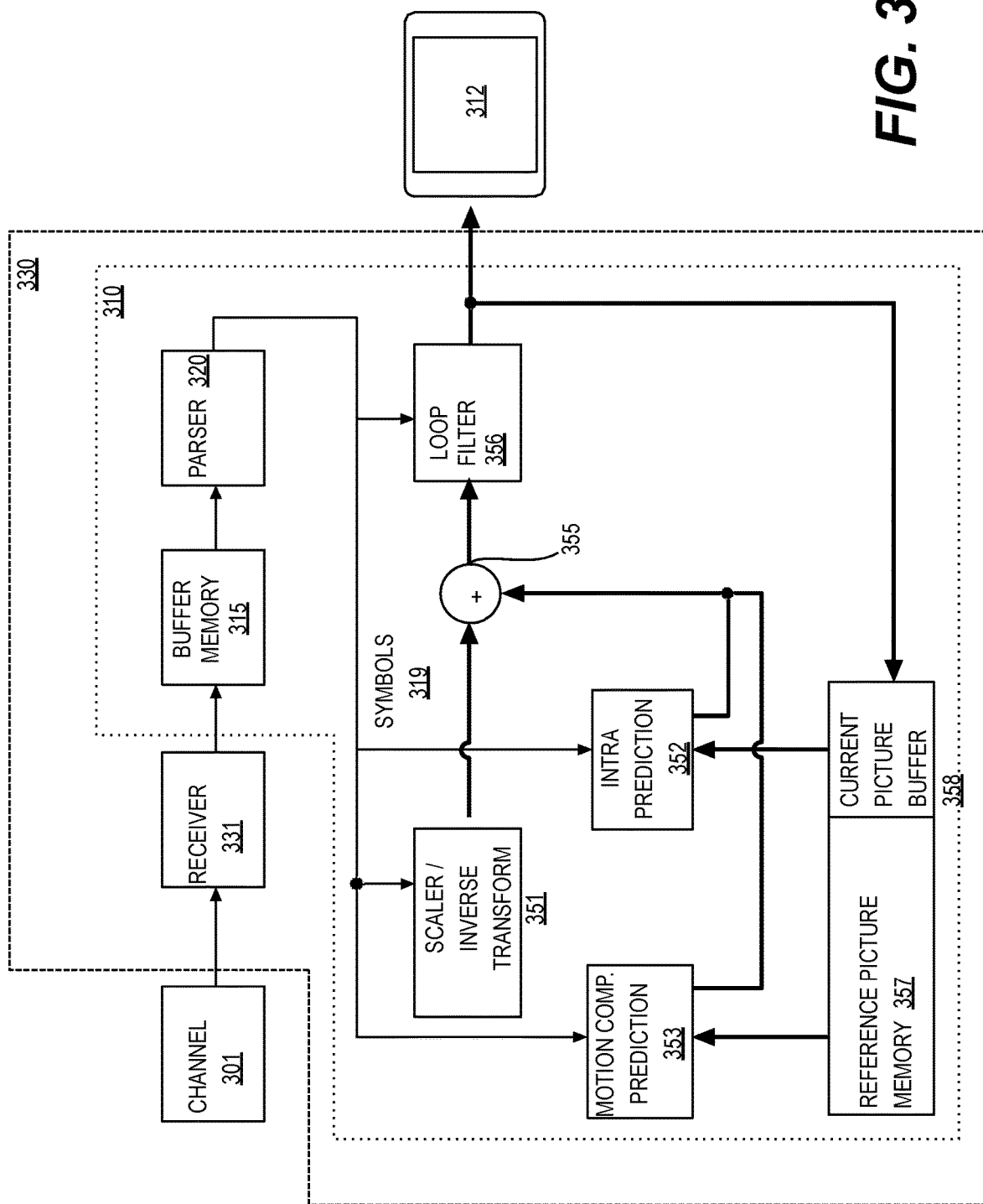
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
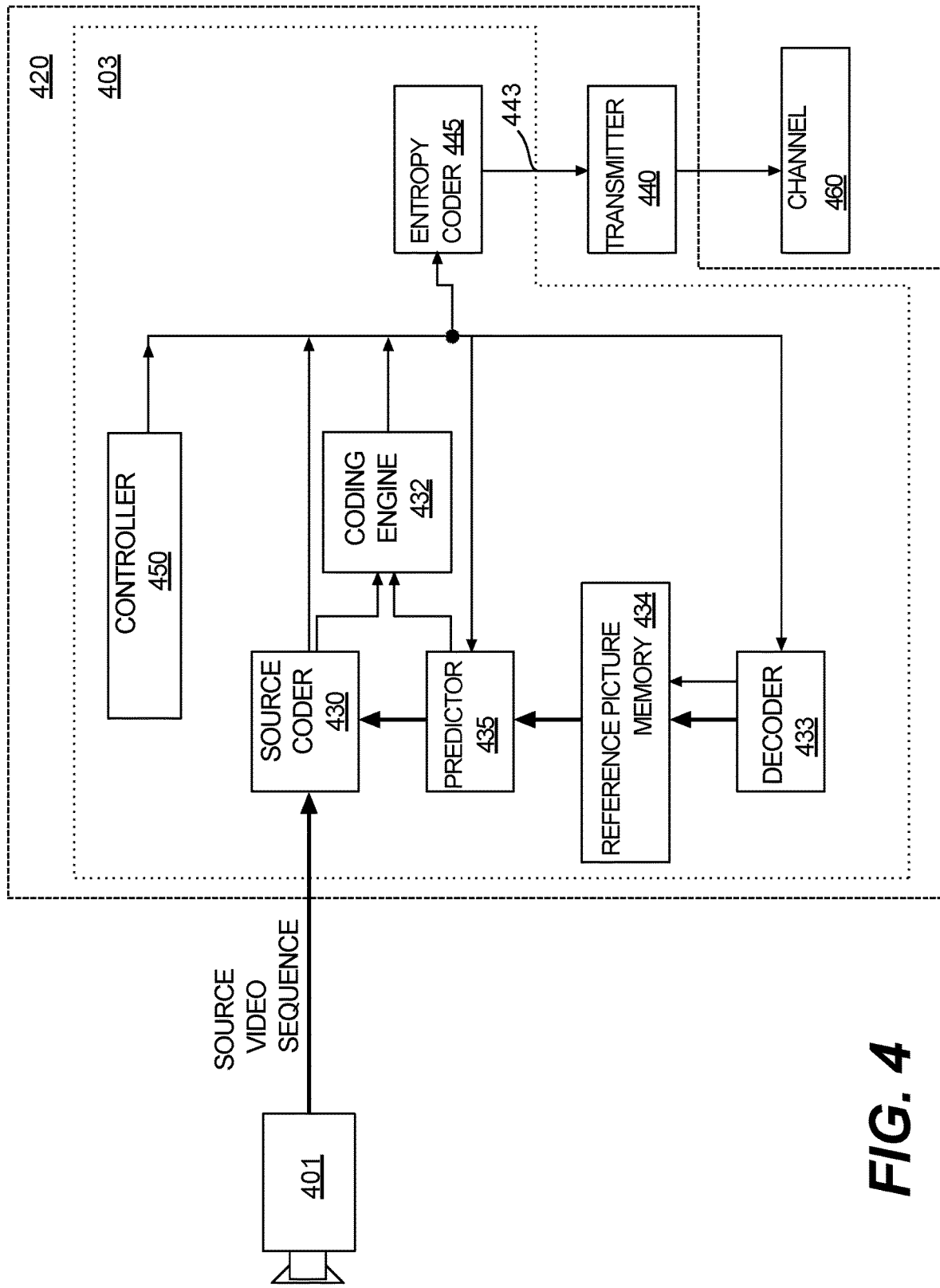
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive pictures. Source pictures commonly may be subdivided spatially into a plurality of sample coding blocks as described in further detail below.

Figure 5:
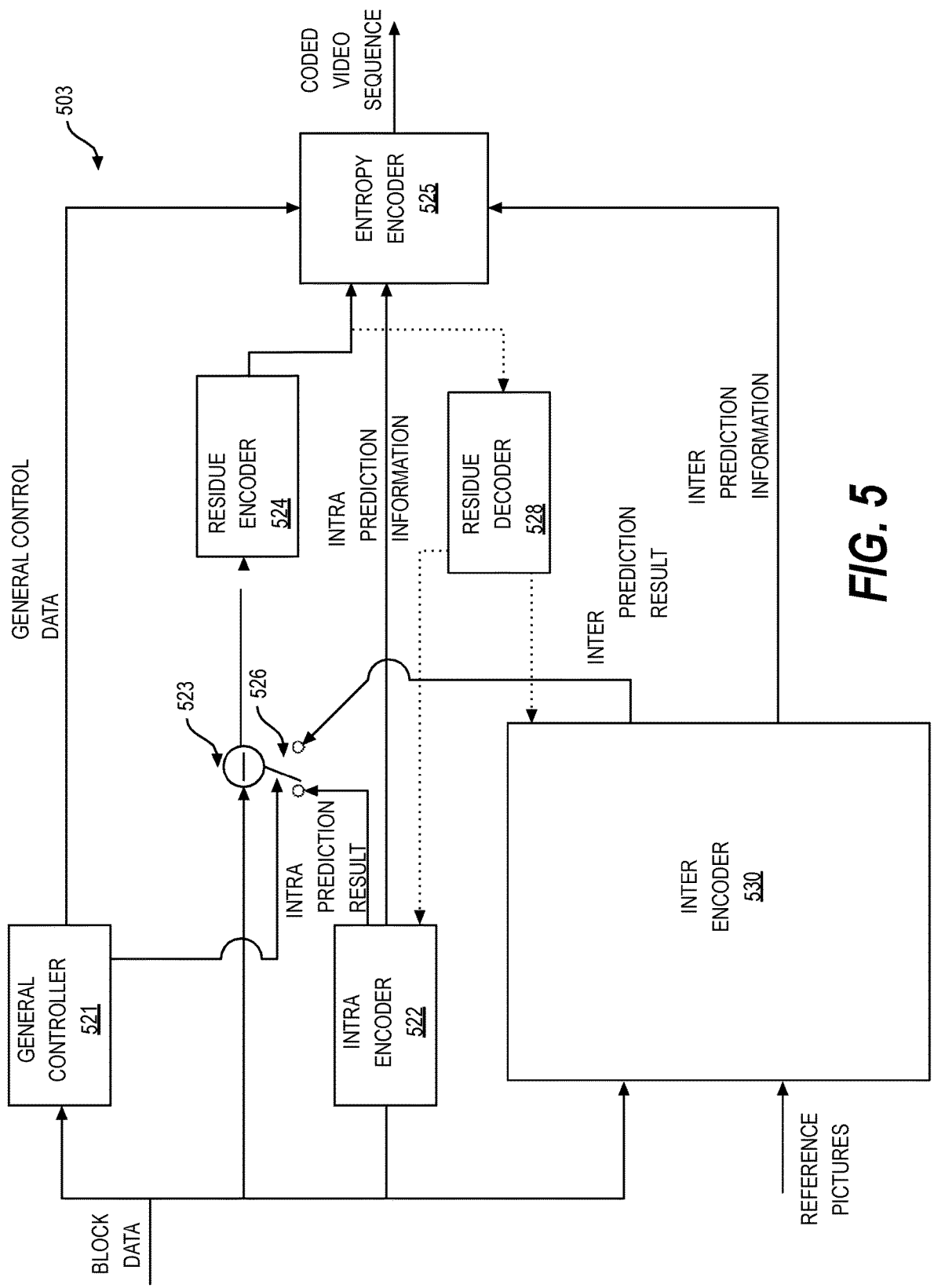
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
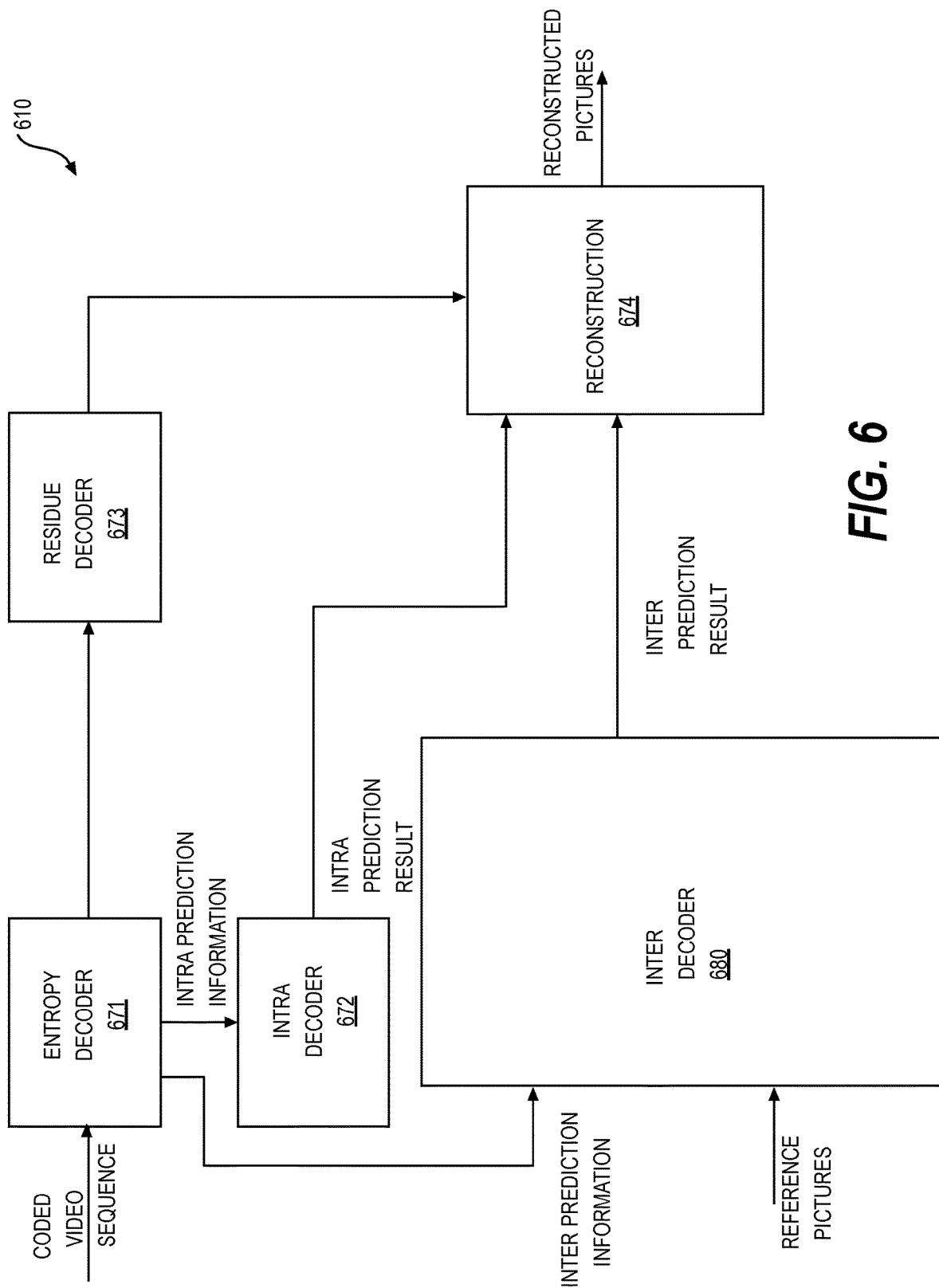
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Turning to inter prediction, for each inter-predicted CU, motion parameters consisting of motion vectors, reference picture indices and reference picture list usage index, and other additional information may be used for inter-predicted sample generation. A motion parameter may be signaled in an explicit or implicit manner. When a CU is coded with skip mode, the CU may be associated with one PU and may have no significant residual coefficients and no coded motion vector delta or reference picture index. A merge mode may be specified whereby the motion parameters for the current CU are obtained from neighboring CUs, including from their spatial and/or temporal candidates. The merge mode may be applied to any inter-predicted CU, not only for skip mode. An example alternative to the merge mode for a CU may be explicit transmission of motion parameters, where motion vector, corresponding reference picture index for each reference picture list and reference picture list usage flag and other information are signaled explicitly for the CU. Various underprediction coding tools are described in further detail below including but not limited to Extended merge prediction; Merge motion vector difference (MMVD), Advanced Motion Vector Predictor (AMVP) mode with symmetric MVD signalling; Affine motion compensated prediction; Subblock-based temporal motion vector prediction (SbTMVP); Adaptive motion vector resolution (AMVR); Motion field storage: $\frac{1}{16}^{th}$ luma sample MV storage and 8×8 motion field compression; Bi-prediction with CU-level weights (BCW); Bi-directional optical flow (BDOF); Decoder side motion vector refinement (DMVR); Combined inter and intra prediction (CIIP); Geometric partitioning mode (GPM)

In some examples, an extended merge prediction may be implemented. For example, a merge candidate list may be constructed by including the following five types of candidates in order:

Spatial Motion Vector Predictor (MVP) from spatial neighbour CUs;
Temporal MVP from co-located CUS;
History-based MVP from a First-In-First-Out (FIFO) table;
Pairwise average MVP;
Zero MVs.

The size of merge list may be signalled in slice header and the maximum allowed size of merge list may be predefined (e.g., 6). For each CU coded in the merge mode, an index of best merge candidate may be encoded using truncated unary binarization (TU). For example, the first bin of the merge index may be coded with context and bypass coding may be used for other bins.

Each category of merge candidates above may be generated via various processes as described below. In some example implementations, for spatial MVP candidate derivation, a maximum of four merge candidates may be selected among candidates located in the positions depicted in FIG. 7. The order of derivation may be $B_1, A_1, B_0, A_0$, and $B_2$. Position $B_2$, for example, may be considered only when any CU of position $A_0, B_0, B_1, A_1$ is not available (e.g., because it belongs to another slice or tile) or is intra coded. After candidate at position $A_1$ is added, the addition of the remaining candidates may be subject to a redundancy check which ensures that candidates with same motion information are excluded from the list so that coding efficiency is improved. In some example implementations, to reduce computational complexity, not all possible candidate pairs are considered in the redundancy check. Instead, only the pairs linked with an arrow in FIG. 8 may be considered and a candidate may only be added to the list if the corresponding candidate used for redundancy check has not the same motion information.

Figure 9:
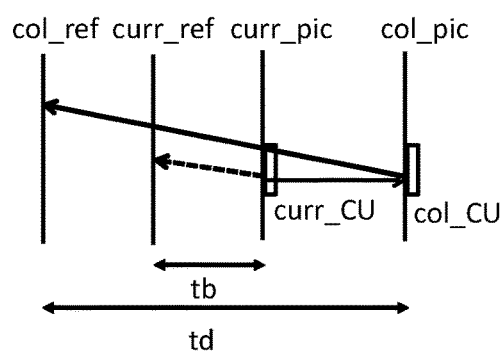
FIG. 9 shows exemplary motion vector scaling for a temporal merge candidate.

In some example implementations, temporal MVP may be considered next for the MVP candidate derivation. For example, one temporal candidate may be added to the list. Particularly, in the derivation of this temporal merge candidate, a scaled motion vector may be derived based on co-located CU belonging to the co-located reference picture. The reference picture list to be used for derivation of the co-located CU may be explicitly signaled in the slice header. The scaled motion vector for temporal merge candidate may be obtained as illustrated by the dotted line in FIG. 9, which is scaled from the motion vector of the co-located CU ("col_CU") using the POC distances, tb and td, where tb is defined to be the POC difference between the reference picture of the current picture ("curr_ref") and the current picture and td is defined to be the POC difference between the reference picture of the co-located picture ("col_ref") and the co-located picture ("col_pic"). The reference picture index of temporal merge candidate may be set equal to zero.

Figure 10:
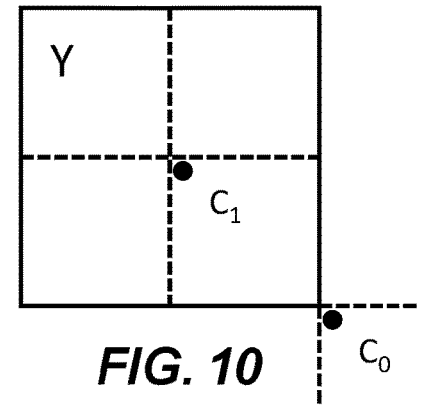
FIG. 10 shows exemplary candidate positions (e.g., C0 and C1) for a temporal merge candidate of a current coding unit.

In some example implementations, a position for the temporal candidate may be selected between candidates $C_0$ and $C_1$, as depicted in FIG. 10. If the CU at position $C_0$ is not available, is intra coded, or is outside of the current row of CTUs, position C1 may be used. Otherwise, position $C_0$ may be used in the derivation of the temporal merge candidate.

In some example implementations, only translation motion model is applied for motion compensation prediction (MCP), which may be referred to as tradition motion compensation model. However, in the real-world images or video frames, there may be other types of kinds of motion, e.g., zoom in/out, rotation, perspective change, distortion, and the other irregular motions, in addition to translation in predefined directions. In some example implementations, in order to simplify the motion compensation prediction, block based affine transform prediction is applied, a block-based affine transform motion compensation prediction may be applied. In such implementations, traditional translation-only motion would be a special case of the affine motion model. As shown FIG. 11A and FIG. 11B, the affine motion field of a block "Cur" may be described by motion information of two control point (4-parameter, FIG. 11A) or three control point motion vectors (6-parameter, FIG. 11B). A motion vector of a control point may be referred to as a Control Point Motion Vector (CPMV).

Figures 11A, 11B:
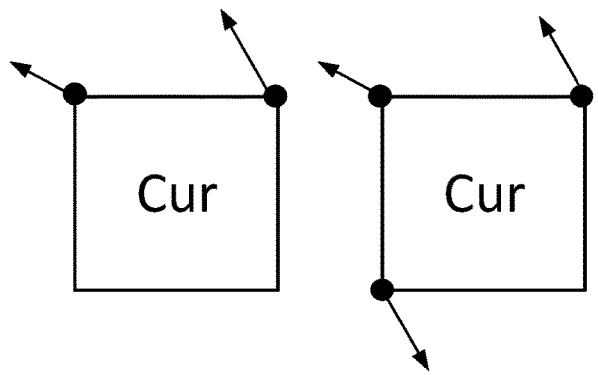
FIGS. 11A-11B show affine motion fields in some examples.

As an example, for a 4-parameter affine motion model, as shown in FIG. 11A, motion vector at sample location (x, y) in the block "Cur" may be derived as function of the sample location:

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \quad (1)$$

which may be parameterized as:

$$\begin{cases} mv_x = ax + by + c \\ mv_y = -bx + ay + f \end{cases} \quad (2)$$

As another example, for a 6-parameter affine motion model, as shown in FIG. 11A and FIG. 11B, motion vector at sample location (x, y) in a block may be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (3)$$

which may be parameterized as"

$$\begin{cases} mv_x = ax + by + c \\ mv_y = dx + ey + f \end{cases} \quad (4)$$

In the formulation above, ($mv_{0x}$, $mv_{0y}$) represents a motion vector of the top-left corner control point, ($mv_{1x}$, $mv_{1y}$) represents a motion vector of the top-right corner control point, and ($mv_{2x}$, $mv_{2y}$) represents a motion vector of the bottom-left corner control point.

Figure 12:
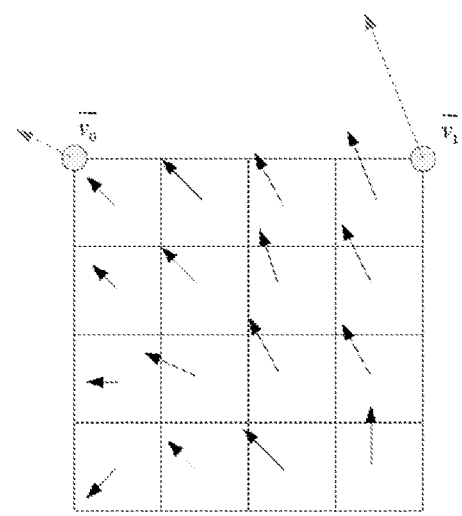
FIG. 12 shows block based affine transform prediction in some examples.

In some further example implementations of block-based affine transform prediction, sub-block based affine transform prediction may be applied. A block may be divided into subblocks, e.g., 4×4 sub-blocks To derive motion vector of, for example, each 4×4 luma sub-block, the motion vector of the center sample of each sub-block, as shown in FIG. 12 (where each small square represents a sub-block), may be calculated according to above equations (depending on whether a 4 parameter or a 6 parameter model is used, and FIG. 12 illustrates the 4 parameter model as an example), and rounded to a predefined precision, e.g., a 1/16 fraction accuracy. Then motion compensation interpolation filters may be applied to generate the prediction of each sub-block with the derived motion vector. The sub-block size of chroma-components may also be set to the same (e.g., 4×4). The MV of a 4×4 chroma sub-block may be calculated as an average of the MVs of the four corresponding 4×4 luma sub-blocks (assuming that luma samples are sampled twice as much as chroma samples). Such an affine model thus takes into consideration warping at sub-block units, but for each sub-block, only translational motion compensation is taken into consideration, in order to reduce computational complexity involved in full pixel level warping compensation.

In some further example implementations and as implemented for translational motion only inter prediction, the affine motion inter prediction mode may be implemented in an affine merge mode and/or in an affine advanced MVP (AMVP) mode.

In an example, the affine merge mode, referred to as AF_MERGE mode, may be applied for CUs with both width and height larger than or equal to a predefined size, e.g., 8. In this mode, the CPMVs of the current CU may be generated based on the motion information of the spatial neighboring CUs. There can be up to a predefined number (e.g., five) of CPMV Predictor (CPMVP) candidates and an index may be signalled to indicate the one to be used for the current CU. The following three types of CPVM candidates may be used to form the affine merge candidate list:

Inherited affine merge candidates that are extrapolated from the CPMVs of the neighbour CUs;
Constructed affine merge candidates CPMVPs that are derived using the translational MVs of the neighbour CUs;
Zero MVs.

Figure 7:
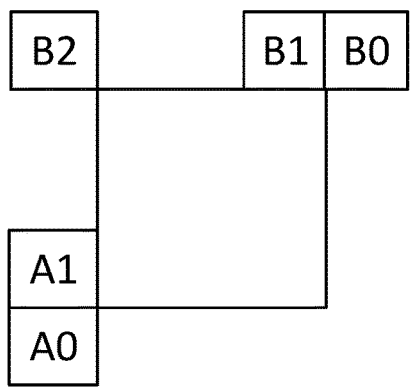
FIG. 7 shows positions of spatial merge candidates according to an embodiment of the disclosure.
Figure 8:
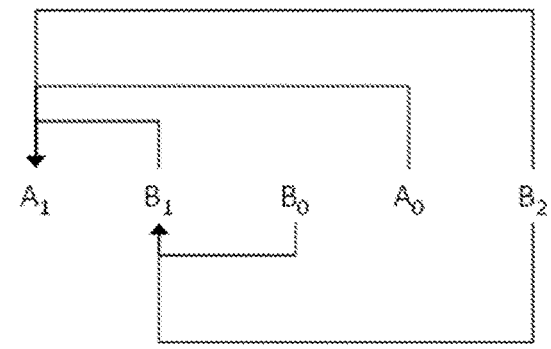
FIG. 8 shows candidate pairs that are considered for a redundancy check of spatial merge candidates according to an embodiment of the disclosure.

In some example implementations, there may be a predefined maximum number (e.g., 2) of inherited affine candidates, which may be derived from affine motion model of the neighboring blocks, e.g., one from left neighboring CUs and one from above neighboring CUs. Example candidate blocks are shown in FIG. 7 above. For the left predictor, the scan order for candidate may be A0→A1, and for the above predictor, the scan order is B0→B1→B2. In some implementations, only the first inherited candidate from each side is selected. No pruning check may be performed between two inherited candidates. When a neighboring affine CU is identified, its control point motion vectors may be used to derive the CPMVP candidates in the affine merge list of the current CU. As shown in FIG. 13, if the neighbour left bottom block A is coded in affine mode, the motion vectors $v_2$, $v_3$ and $v_4$ of the top left corner, above right corner and left bottom corner of the CU which contains the block A may be attained. When block A is coded with 4-parameter affine model, the two CPMVs of the current CU may be calculated according to $v_2$, and $v_3$. In case that block A is coded with 6-parameter affine model, the three CPMVs of the current CU are calculated according to $v_2$, $v_3$ and $v_4$.

A constructed affine candidate above may refer to a candidate that is constructed by combining the neighbor translational motion information of each control point. The motion information for the control points may be derived from the specified spatial neighbors and temporal neighbor shown in FIG. 14. CPMVK (k=1, 2, 3, 4) represents the k-th control point. For $CPMV_1$, the B2→B3→A2 blocks are checked and the MV of the first available block may be used. For $CPMV_2$, the B1→B0 blocks are checked and for $CPMV_3$, the A1→A0 blocks are checked. A Temporal MVP (TMVP) is used as $CPMV_4$ if it is available.

After MVs of the four control points are attained, affine merge candidates may be constructed based on that motion information. The following example combinations of control point MVs may be used to construct the affine merge candidates in the indicated order: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

Specifically, the combination of 3 CPMVs constructs a 6-parameter affine merge candidate and the combination of 2 CPMVs constructs a 4-parameter affine merge candidate. In some example implementations, to avoid a motion scaling process, if the reference indices of control points are different, the related combination of control point MVs may be discarded.

In some example implementations, after inherited affine merge candidates and constructed affine merge candidate are checked, as described above, if the list is still not full (according to the predefined maximum number candidates in the list), zero MVs may be inserted to the end of the list.

For another example, an affine AMVP mode may be applied for CUs with both width and height larger than or equal to a predefined size, e.g., 16. An affine flag in CU level may be signalled in the bitstream to indicate whether the affine AMVP mode is used and if so, then another flag may be signaled to indicate whether 4-parameter affine or 6-parameter affine model is used. In this mode, the difference of the CPMVs of current CU and their predictors CPMVPs may be signalled in the bitstream. The affine AVMP candidate list size may be predetermined, e.g., 2, and it may be generated by using the following example four types of CPVM candidate in the example indicated order:

Inherited affine AMVP candidates that are extrapolated from the CPMVs of the neighbour CUs;
Constructed affine AMVP candidates CPMVPs that are derived using the translational MVs of the neighbour CUs;
Translational MVs from neighboring CUs;
Zero MVs.

The checking order of inherited affine AMVP candidates may be the same to the checking order of inherited affine merge candidates. The difference, for example, may be that, for AMVP candidate, only the affine CU that has the same reference picture as in the current block may be considered. No pruning process may be applied when inserting an inherited affine motion predictor into the candidate list.

Constructed AMVP candidate may be derived from the specified spatial neighbors shown in FIG. 14. The same checking order as in the affine merge mode above may be used for candidate construction. In addition, reference picture index of the neighboring block may also be checked. The first block in the checking order that is inter coded and has the same reference picture as in current CUs may be used. There may be only one when the current CU is coded with 4-parameter affine mode, and $mv_0$ and $mv_1$ are both available, they are added as one candidate in the affine AMVP list. When the current CU is coded with 6-parameter affine mode, and all three CPMVs are available, they may be added as one candidate in the affine AMVP list. Otherwise, constructed AMVP candidate may be set as unavailable.

If affine AMVP list candidates is still less than a predefined number, e.g., 2, after inherited affine AMVP candidates and constructed AMVP candidate are checked, $mv_0$, $mv_1$ and $mv_2$ may be added, in order, as the translational MVs to predict all control point MVs of the current CU, when available. Finally, for example, zero MVs are used to fill the affine AMVP list if it is still not full.

In some example implementations, sub-block based affine motion compensation described above can save memory access bandwidth and reduce computation complexity compared to pixel-based motion compensation, at the cost of prediction accuracy penalty (as described above, warping would only be considered at sub-block level, but not within each sub-block). In some other example implementations, to achieve a finer granularity of warped motion compensation, prediction refinement with optical flow (PROF) may be used to refine the sub-block based affine motion compensated prediction without significantly increasing the memory access bandwidth for motion compensation. For example, luma prediction sample may be refined by adding a difference derived by one or more optical flow equations. An example PROF may include the following four steps:

Step 1): The sub-block-based affine motion compensation may first be performed to generate subblock prediction I(i, j).

Step 2): Spatial gradients $g_x(i, j)$ and $g_y(i, j)$ of the sub-block prediction may then be calculated at each sample location using, for example, a 3-tap filter [−1, 0, 1]. The gradient calculation may be exactly the same as gradient calculation in Bidirectional Optical Flow (BDOF). For example, the spatial gradients $g_x(i,j)$ and $g_y(i,j)$ may be calculated as:

$$g_x(i, j) = (I(i + 1, j) \gg shift1) - (I(i - 1, j) \gg shift1) \quad (5)$$

$$g_y(i, j) = (I(i, j + 1) \gg shift1) - (I(i, j - 1) \gg shift1) \quad (6)$$

where shift1 is used to control the gradient's precision. The subblock (i.e., 4×4 in size) prediction may be extended by one sample on each side for the gradient calculation. To avoid additional memory bandwidth and additional interpolation computation, those extended samples on the extended borders may be copied from the nearest integer pixel position in the reference picture.

Step 3): The luma prediction refinement may be calculated by the following example optical flow equation.

$$\Delta I(i, j) = g_x(i, j) * \Delta v_x(i, j) + g_y(i, j) * \Delta v_y(i, j) \quad (7)$$

where the $\Delta v(i, j)$ represents a difference between sample MV computed for sample location (i, j), denoted by v(i, j), and the sub-block MV of the sub-block to which sample (i, j) belongs, as shown FIG. 15. The $\Delta v(i, j)$ is quantized in the unit of predetermined or signaled luma sample precision, e.g., 1/32 luma sample precision.

Since the affine model parameters and the sample location relative to the subblock center do not change from subblock to subblock, $\Delta v(i, j)$ may be calculated for the first sub-block, and reused for other sub-blocks in the same CU. Let dx(i, j) and dy(i, j) be the horizontal and vertical offsets from the sample location (i, j) to the center of the subblock ($x_{SB}$, $y_{SB}$), $\Delta v(x, y)$ can be derived by the following example equations, $$\begin{cases} dx(i, j) = i - x_{SB} \\ dy(i, j) = j - y_{SB} \end{cases} \quad (8)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (9)$$

In order to keep accuracy, the enter of the subblock ($x_{SB}$, $y_{SB}$) may be calculated as (($W_{SB}$−1)/2, ($H_{SB}$−1)/2), where $W_{SB}$ and $H_{SB}$ are the subblock width and height, respectively.

For a 4-parameter affine model, $$\begin{cases} C = F = \dfrac{v_{1x} - v_{0x}}{w} \\ E = -D = \dfrac{v_{1y} - v_{0y}}{w} \end{cases} \quad (10)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (11)$$

where ($v_{0x}$, $v_{0y}$), ($v_{1x}$, $v_{1y}$), ($v_{2x}$, $v_{2y}$) are the top-left, top-right and bottom-left control point motion vectors, w and h are the width and height of the CU.

Step 4): Finally, the luma prediction refinement $\Delta I$ (i, j) may be added to the sub-block prediction I(i, j). The final prediction I' may then be generated, for example, as:

$$I'(i, j) = I(i, j) + \Delta I(i, j) \quad (12)$$

In some example implementations, the PROF may not be applied in two cases for an affine coded CU: 1) when all control point MVs are the same, which indicates the CU only has translational motion; or 2) the affine motion parameters are greater than a specified limit because the sub-block based affine motion compensation is degraded to CU based motion compensation to avoid large memory access bandwidth requirement.

In some examples, a sub-block-based temporal motion vector prediction (SbTMVP) method may be implemented. An example SbTMVP, for example, may use motion field in co-located picture to improve motion vector prediction and merge mode for CUs in the current picture. The same co-located picture used by temporal motion vector prediction (TMVP) may be used for SbTVMP. SbTMVP differs from TMVP in the following two main aspects:

TMVP predicts motion at CU level but SbTMVP predicts motion at sub-CU level;

While TMVP fetches the temporal motion vectors from the co-located block in the co-located picture (the co-located block is the bottom-right or center block relative to the current CU), SbTMVP applies a motion shift before fetching the temporal motion information from the co-located picture, where the motion shift may be obtained from the motion vector from one of the spatial neighboring blocks of the current CU.

An example SbTVMP process is illustrated in FIG. 16 and FIG. 17. SbTMVP predicts the motion vectors of the sub-CUs within the current CU in two example steps. In the first step, the spatial neighbor A1 in FIG. 16 may be examined. If A1 has a motion vector that uses the co-located picture as its reference picture, this motion vector may be selected to be the motion shift to be applied. If no such motion is identified, then the motion shift may be set to (0, 0).

In the second step, the motion shift identified in Step 1 may be applied (i.e. added to the current block's coordinates) to obtain sub-CU-level motion information (motion vectors and reference indices) from the co-located picture as shown in FIG. 17. The example in FIG. 17 assumes that the motion shift is set to block A1's motion. Then, for each sub-CU, the motion information of its corresponding block (the smallest motion grid that covers the center sample) in the co-located picture may be used to derive the motion information for the sub-CU. After the motion information of the co-located sub-CU is identified, it may then be converted to the motion vectors and reference indices of the current sub-CU in a similar way as regular TMVP process, where temporal motion scaling is applied to align the reference pictures of the temporal motion vectors to those of the current CU.

In some example implementations, bi-prediction with CU-level weight (BCW) may be used, where a bi-prediction signal may be generated by averaging two prediction signals obtained from two different reference pictures and/or using two different motion vectors. Further, the bi-prediction mode may be extended beyond simple averaging to allow weighted averaging of the two prediction signals.

$$P_{bi-pred} = ((8 - w) * P_0 + w * P_1 + 4) \gg 3, \quad (13)$$

where a number of (e.g., five) weights may be allowed in the weighted averaging bi-prediction, e.g., w∈ {−2, 3, 4, 5, 10}. For each bi-predicted CU, the weight w may be determined in one of two ways: 1) for a non-merge CU, the weight index may be signalled after the motion vector difference; 2) for a merge CU, the weight index may be inferred from neighbouring blocks based on the merge candidate index. BCW may only be applied to CUs with a minimum number (e.g., 256) or more luma samples (i.e., CU width times CU height is greater than or equal to the minimum number, e.g., 256).

For low-delay pictures, all 5 weights may be used. For non-low-delay pictures, only a subset, e.g., 3 weights (w∈ {3, 4, 5}) may be used.

At the encoder, fast search algorithms may be applied to find the weight index without significantly increasing the encoder complexity. In some example implementations, when combined with AMVR, unequal weights may only be conditionally checked for 1-pel and 4-pel motion vector precisions if the current picture is a low-delay picture.

In some example implementations, when combined with affine, affine ME may be performed for unequal weights if and only if the affine mode is selected as the current best mode.

In some example implementations, when the two reference pictures in bi-prediction are the same, unequal weights are only conditionally checked.

In some example implementations, unequal weights may not be searched when certain conditions are met, depending on the POC distance between current picture and its reference pictures, the coding quantization parameter (QP), and the temporal level.

In some example implementations, the BCW weight index may be coded using one context coded bin followed by bypass coded bins. The first context coded bin indicates if equal weight is used; and if unequal weight is used, additional bins may be signalled using bypass coding to indicate which unequal weight is used.

In some example implementations, weighted prediction (WP) may be supported to efficiently code video content with fading. WP may allow weighting parameters (weight and offset) to be signalled for each reference picture in each of the reference picture lists L0 and L1. Then, during motion compensation, the weight(s) and offset(s) of the corresponding reference picture(s) may be applied. WP and BCW may be designed for different types of video content. In order to avoid interactions between WP and BCW, if a CU uses WP, then the BCW weight index may not be signalled, and w may be inferred to be 4 (e.g., equal weight is applied). For a merge CU, the weight index may be inferred from neighbouring blocks based on the merge candidate index. This can be applied to both normal merge mode and inherited affine merge mode. For constructed affine merge mode, the affine motion information may be constructed based on the motion information of up to, for example, 3 blocks. The BCW index for a CU using the constructed affine merge mode may be simply set equal to the BCW index of the first control point MV.

In some implementations, combined inter-intra prediction (CIIP) and BCW may not be jointly applied for a CU. When a CU is coded with CIIP mode, the BCW index of the current CU may be set to, for example, 2, e.g. equal weight.

In some further examples, a modified bi-directional optical flow (BDOF) may be implemented. BDOF, in comparison to traditional bi-direction optical flow (BIO), the example BDOF may be a simpler version that requires much less computation, especially in terms of number of multiplications and the size of the multiplier.

For example, BDOF may be used to refine the bi-prediction signal of a CU at the 4×4 subblock level. In some example implementations, BDOF may be applied to a CU if it satisfies all the following conditions:

The CU is coded using "true" bi-prediction mode, i.e., one of the two reference pictures is prior to the current picture in display order and the other is after the current picture in display order;

The distances (i.e. POC difference) from two reference pictures to the current picture are same;

Both reference pictures are short-term reference pictures;
The CU is not coded using affine mode or the SbTMVP merge mode;
CU has more than a number (e.g., 64) of luma samples;
Both CU height and CU width are larger than or equal to a number of (e.g., 8) luma samples;
BCW weight index indicates equal weight;
WP is not enabled for the current CU;
CIIP mode is not used for the current CU.

In some example implementations, BDOF may only be applied to the luma component. As its name indicates, the BDOF mode may be based on the optical flow concept, which assumes that the motion of an object is smooth. For each, e.g., 4×4 subblock, a motion refinement ($v_x$, $v_y$) may be calculated by minimizing the difference between the L0 and L1 prediction samples. The motion refinement may then be used to adjust the bi-predicted sample values in the 4×4 subblock. The following example steps may be applied in the BDOF process.

First, horizontal and vertical gradients, $\partial I^{(k)}/\partial x$ (i, j) and $\partial I^{(k)}/\partial y$ (i, j), k=0, 1, of the two prediction signals may be computed by directly calculating the difference between two neighboring samples, i.e., $$\frac{\partial I^{(k)}}{\partial x}(i, j) = \left(\left(I^{(k)}(i+1, j) \gg \text{shift1}\right) - \left(I^{(k)}(i-1, j) \gg \text{shift1}\right)\right) \quad (14)$$

$$\frac{\partial I^{(k)}}{\partial y}(i, j) = \left(\left(I^{(k)}(i, j+1) \gg \text{shift1}\right) - \left(I^{(k)}(i, j-1) \gg \text{shift1}\right)\right)$$

where $I^{(k)}$ (i, j) are the sample value at coordinate (i, j) of the prediction signal in list k, k=0, 1, and shift1 may be calculated based on the luma bit depth, bitDepth, as shift1=max(6, bitDepth-6).

Then, an auto- and cross-correlation of the gradients, $S_1$, $S_2$, $S_3$, $S_5$ and $S_6$, may be calculated as $$S_1 = \sum_{(i,j)\in\Omega}\text{Abs}(\psi_x(i, j)), S_3 = \sum_{(i,j)\in\Omega}\theta(i, j)\cdot\text{Sign}(\psi_x(i, j)) \quad (15)$$

$$S_2 = \sum_{(i,j)\in\Omega}\psi_x(i, j)\cdot\text{Sign}(\psi_y(i, j))$$

$$S_5 = \sum_{(i,j)\in\Omega}\text{Abs}(\psi_y(i, j)), S_6 = \sum_{(i,j)\in\Omega}\theta(i, j)\cdot\text{Sign}(\psi_y(i, j))$$

where $$\psi_x(i, j) = \left(\frac{\partial I^{(1)}}{\partial x}(i, j) + \frac{\partial I^{(0)}}{\partial x}(i, j)\right) \gg n_a \quad (16)$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

and where $\Omega$ is a 6×6 window around the 4×4 subblock, and the values of $n_a$ and $n_b$ are set equal to min(1, bitDepth-11) and min(4, bitDepth-8), respectively.

The motion refinement ($v_x$, $v_y$) may then be derived using the cross- and auto-correlation terms using the following:

$$v_x = S_1 > 0 ? \text{clip3}(-th'_{BIO}, th'_{BIO}, -((S_3 \cdot 2^{n_b - n_a}) \gg \lfloor\log_2 S_1\rfloor)): 0 \quad (17)$$

$$v_y = S_5 > \quad (18)$$

$$0?\text{clip3}\left(-th'_{BIO}, th'_{BIO}, -\left((S_6 \cdot 2^{n_b-n_a} - \left((v_x S_{2,m}) \ll n_{S_2} + v_x S_{2,s}\right)/2\right) \gg \lfloor\log_2 S_5\rfloor\right)): 0$$

where $S_{2,m}=S_2\gg n_{S_2}$, $S_{2,s}=S_2\&(2^{n_2}-1)$, $th'_{BIO}=2^{max(5,BD-7)}$; $\lfloor\cdot\rfloor$ is the floor function, and $n_{S_2}=12$.

Based on the motion refinement and the gradients, the following adjustment may be calculated for each sample in the 4×4 subblock:

$$b(x, y) = \quad (19)$$
$$rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right)$$

Finally, the BDOF samples of the CU may be calculated by adjusting the bi-prediction samples as follows:

$$pred_{BDOF}(x, y) = \left(I^{(0)}(x, y) + I^{(1)}(x, y) + b(x, y) + o_{offset}\right) \gg \text{shift} \quad (20)$$

These values may be selected such that the multipliers in the BDOF process do not exceed, for example, 15-bit, and the maximum bit-width of the intermediate parameters in the BDOF process is kept within, for example, 32-bit.

In some example implementations, in order to derive the gradient values, some prediction samples $I^{(k)}$(i, j) in list k (k=0, 1) outside of the current CU boundaries may need to be generated. As depicted in FIG. 18, an example BDOF may use one extended row/column around the CU's boundaries 1802. In order to control the computational complexity of generating the out-of-boundary prediction samples, the prediction samples in the extended area (the most outer rows and columns) may be generated by taking the reference samples at the nearby integer positions (using floor( ) operation on the coordinates) directly without interpolation, and the normal example 8-tap motion compensation interpolation filter may be used to generate prediction samples within the CU (within the boundary 1802). These extended sample values may be used in gradient calculation only. For the remaining steps in the BDOF process, if any sample and gradient values outside of the CU boundaries are needed, they may be padded (i.e. repeated) from their nearest neighbors.

When the width and/or height of a CU are larger than a predefined number, for example, 16 luma samples, it may be split into subblocks with width and/or height equal to the predefined number, e.g., 16 luma samples, and the sub-block boundaries may be treated as the CU boundaries in the BDOF process. The maximum unit size for BDOF process may be limited to, for example, 16×16. For each sub-block, the BDOF process could be skipped. When the sum of absolute difference (SAD) of between the initial L0 and L1 prediction samples is smaller than a threshold, the BDOF process may not be applied to the sub-block. The threshold may be set equal to (8*W*(H>>1), where W indicates the sub-block width, and H indicates sub-block height. To avoid the additional complexity of SAD calculation, the SAD between the initial L0 and L1 prediction samples calculated in DVMR process may be re-used here.

In some example implementations, if BCW is enabled for the current block, i.e., the BCW weight index indicates unequal weight, then bi-directional optical flow may be disabled. Similarly, if WP is enabled for the current block, i.e., the luma_weight_lx_flag is 1 for either of the two reference pictures, then BDOF may also be disabled. In some example implementations, when a CU is coded with symmetric MVD mode or CIIP mode, BDOF may also disabled.

In some examples, decoder side motion vector refinement (DMVR) may be implemented. For example, in order to increase the accuracy of the MVs of the merge mode, a bilateral-matching (BM) based decoder side motion vector refinement may be applied. In bi-prediction operation, a refined MV may be searched around the initial MVs in the reference picture list L0 and reference picture list L1. The BM method may calculate the distortion between the two candidate blocks in the reference picture list L0 and list L1. As illustrated in FIG. 19, the SAD between the red blocks based on each MV candidate around the initial MV may be calculated. The MV candidate with the lowest SAD may become the refined MV and used to generate the bi-predicted signal.

In some example implementations, the application of DMVR may be restricted and may only be applied for the CUs which are coded with following modes and features:
  CU level merge mode with bi-prediction MV;
  One reference picture is in the past and another reference picture is in the future with respect to the current picture;
  The distances (i.e., POC difference) from two reference pictures to the current picture are same
  Both reference pictures are short-term reference pictures;
  CU has more than a predefined number of, e.g., 64 luma samples;
  Both CU height and CU width are larger than or equal to a predefined number of, e.g., 8 luma samples;
  BCW weight index indicates equal weight;
  WP is not enabled for the current block;
  CIIP mode is not used for the current block.

In some example implementations, the refined MV derived by DMVR process may be used to generate the inter prediction samples and also used in temporal motion vector prediction for future pictures coding. While the original MV is used in deblocking process and also used in spatial motion vector prediction for future CU coding.

In some example implementations of DVMR, the search points surrounding the initial MV and the MV offset may obey the MV difference mirroring rule. In other words, any points that are checked by DMVR, denoted by candidate MV pair (MV0, MV1) may obey the following two equations:

$$MV0' = MV0 + \text{MV\_offset} \quad (21)$$

$$MV1' = MV1 - \text{MV\_offset} \quad (22)$$

where MV_offset represents the refinement offset between the initial MV and the refined MV in one of the reference pictures. The refinement search range is two integer luma samples from the initial MV. The searching includes the integer sample offset search stage and fractional sample refinement stage.

In some example implementations, a number of, e.g., 25 points full search may be applied for integer sample offset searching. The SAD of the initial MV pair may be first calculated. If the SAD of the initial MV pair is smaller than a threshold, the integer sample stage of DMVR may be terminated. Otherwise, SADs of the remaining 24 points may be calculated and checked in raster scanning order. The point with the smallest SAD may be selected as the output of integer sample offset searching stage. To reduce the penalty of the uncertainty of DMVR refinement, the original MV during the DMVR process may be favored. The SAD between the reference blocks referred by the initial MV candidates may be decreased by ¼ of the SAD value.

In some example implementations, the integer sample search may be followed by fractional sample refinement. To save the calculational complexity, the fractional sample refinement may be derived by using parametric error surface equation, instead of additional search with SAD comparison. The fractional sample refinement may be conditionally invoked based on the output of the integer sample search stage. When the integer sample search stage is terminated with center having the smallest SAD in either the first iteration or the second iteration search, the fractional sample refinement may be further applied.

In some example implementations, in parametric error surface based sub-pixel offsets estimation, the center position cost and the costs at four neighboring positions from the center may be used to fit a 2-D parabolic error surface equation of the following form $$E(x, y) = A(x - x_{min})^2 + B(y - y_{min})^2 + C \quad (23)$$

where $(x_{min}, y_{min})$ corresponds to the fractional position with the least cost and C corresponds to the minimum cost value. By solving the above equations by using the cost value of the five search points, the $(x_{min}, y_{min})$ may be computed as:

$$x_{min} = (E(-1, 0) - E(1, 0))/(2(E(-1, 0) + E(1, 0) - 2E(0, 0))) \quad (24)$$

$$y_{min} = (E(0, -1) - E(0, 1))/(2((E(0, -1) + E(0, 1) - 2E(0, 0))) \quad (25)$$

The value of $x_{min}$ and $y_{min}$ above may be automatically constrained to be between, for example, −8 and 8 since all cost values are positive and the smallest value is E(0,0). This, for example, corresponds to half peal offset with 1/16th-pel MV accuracy. The computed fractional $(x_{min}, y_{min})$ may be added to the integer distance refinement MV to get the sub-pixel accurate refinement delta MV.

In some further examples, bilinear-interpolation and sample padding may be implemented. The resolution of the MVs may be, for example, 1/16 luma samples. The samples at the fractional position may be interpolated using, for example, a 8-tap interpolation filter. In DMVR, the search points may surround the initial fractional-pel MV with integer sample offset. Therefore, the samples of those fractional position may need to be interpolated for DMVR search process. To reduce the calculation complexity, the bi-linear interpolation filter may be used to generate the fractional samples for the searching process in DMVR. Another important effect may be that by using bi-linear filter is that with 2-sample search range, the DVMR does not access more reference samples compared to the normal motion compensation process. After the refined MV is attained with DMVR search process, the normal 8-tap interpolation filter may be applied to generate the final prediction. In order to not access more reference samples than normal MC process, the samples, which are not needed for the interpolation process based on the original MV but may be needed for the interpolation process based on the refined MV, will be padded from those available samples.

In some example implementations, when the width and/or height of a CU are larger than a predefined number of, e.g., 16 luma samples, it may be further split into sub-blocks with width and/or height equal to 16 luma samples. The maximum unit size for DMVR searching process may be limit to, for example, 16×16.

In some further examples, a geometric partitioning mode may be implemented for inter prediction. The geometric partitioning mode may be signalled using a CU-level flag as one kind of merge mode, with other merge modes including the regular merge mode, the MMVD mode, the CIIP mode and the sub-block merge mode. A total of, e.g., 64 partitions may be supported by geometric partitioning mode for each possible CU size w×h=$2^m$×$2^n$ with m, n∈{3 . . . 6} excluding, for example, 8×64 and 64×8.

In some example implementations, when this mode is used, a CU may be split into two parts by a geometrically located straight line, as shown in FIG. 20. The location of the splitting line may be mathematically derived from the angle and offset parameters of a specific partition. Each part of a geometric partition in the CU may be inter-predicted using its own motion. For example, only uni-prediction may be allowed for each partition. In other words, each part may have one motion vector and one reference index. The uni-prediction motion constraint may be applied to ensure that, similar to the conventional bi-prediction, only two motion compensated prediction are needed for each CU. The uni-prediction motion for each partition may be derived using the process described further below.

In some example implementations, if geometric partitioning mode (GPM) is used for the current CU, then a geometric partition index indicating the partition mode of the geometric partition (angle and offset), and two merge indices (one for each partition) may be further signalled. The number of maximum GPM candidate size may be signalled explicitly in SPS and specifies syntax binarization for GPM merge indices. After predicting each of part of the geometric partition, the sample values along the geometric partition edge may be adjusted using a blending processing with adaptive weights as described further below. This may be the prediction signal for the whole CU, and transform and quantization process may be applied to the whole CU as in other prediction modes. Finally, the motion field of a CU predicted using the geometric partition modes may be stored as described in further detail below.

Returning to example implementations for uni-prediction candidate list construction, such uni-prediction candidate list may be derived directly from the merge candidate list constructed according to the extended merge prediction process. An index of the uni-prediction motion in the geometric uni-prediction candidate list may be denoted by n. The LX motion vector of the n-th extended merge candidate, with X equal to the parity of n, may be used as the n-th uni-prediction motion vector for geometric partitioning mode. These motion vectors may be marked with "x" in FIG. 21. In case a corresponding LX motion vector of the n—the extended merge candidate does not exist, the L(1−X) motion vector of the same candidate may used instead as the uni-prediction motion vector for geometric partitioning mode.

Further returning to example blending along the geometric partitioning edge above, in some example implementations, after predicting each part of a geometric partition using its own motion, blending may be applied to the two prediction signals to derive samples around geometric partition edge. The blending weight for each position of the CU may be derived based on the distance between individual position and the partition edge.

For example, the distance for a position (x, y) to the partition edge may be derived as:

$$d(x, y) = (2x + 1 - w)\cos(\varphi_i) + (2y + 1 - h)\sin(\varphi_i) - \rho_j \quad (26)$$

$$\rho_j = \rho_{x,j}\cos(\varphi_i) + \rho_{y,j}\sin(\varphi_i) \quad (27)$$

$$\rho_{x,j} = \begin{cases} 0 & i\ \%\ 16 = 8\ \text{or}\ (i\ \%\ 16 \neq 0\ \text{and}\ h \geq w) \\ \pm(j \times w) \gg 2 & \text{otherwise} \end{cases} \quad (28)$$

$$\rho_{y,j} = \begin{cases} \pm(j \times h) \gg 2 & i\ \%\ 16 = 8\ \text{or}\ (i\ \%\ 16 \neq 0\ \text{and}\ h \geq w) \\ 0 & \text{otherwise} \end{cases} \quad (29)$$

where i, j are the indices for angle and offset of a geometric partition, which may depend on the signaled geometric partition index. The sign of $\rho_{x,j}$ and $\rho_{y,j}$ may depend on angle index i.

The weights for each part of a geometric partition above may be derived as following:

$$wIdxL(x, y) = partIdx?32 + d(x, y): 32 - d(x, y) \quad (30)$$

$$w_0(x, y) = \frac{\text{Clip3}(0, 8, (wIdxL(x, y) + 4) \gg 3)}{8} \quad (31)$$

$$w_1(x, y) = 1 - w_0(x, y) \quad (32)$$

In some example implementations, the partIdx above may depend on the angle index i. One example of weigh $w_0$ is illustrated in Error! Reference source not found. 22.

Further returning to the motion field storage for geometric partitioning mode, in some example implementations, Mv1 from the first part of the geometric partition, Mv2 from the second part of the geometric partition and a combined Mv of Mv1 and Mv2 may be stored in the motion filed of a geometric partitioning mode coded CU.

The stored motion vector type for each individual position in the motion filed may be determined as:

$$sType = \quad (33)$$

$$\text{abs}(motionIdx) < 32\,?\,2: (motionIdx \leq 0\,?\,(1 - partIdx): partIdx)$$

where motionIdx is equal to d(4x+2, 4y+2), which may be recalculated. The partIdx may depend on the angle index i.

In some example implementations, if sType is equal to 0 or 1, Mv0 or Mv1 may be stored in the corresponding motion field, otherwise if sType is equal to 2, a combined Mv from Mv0 and Mv2 may be stored. The combined Mv may be generated using the following process:

If Mv1 and Mv2 are from different reference picture lists (one from L0 and the other from L1), then Mv1 and Mv2 are simply combined to form the bi-prediction motion vectors.

Otherwise, if Mv1 and Mv2 are from the same list, only uni-prediction motion Mv2 is stored.

In some further example, adaptive motion vector resolution (AMVR) may be implemented. For example, a fixed motion vector resolution of quarter luma sample may be used. However, because an optimum trade-off between displacement vector rate and prediction error rate may need to be chosen to achieve overall rate-distortion optimality, selection of the motion vector resolution at coding block level may be allowed to trade-off bitrate versus fidelity for the signaling of the motion parameters in some example implementations. This may be enabled by the AMVR mode. The AMVR mode may be signaled at the coding block level if at least one component of an MVD is not equal to zero. The motion vector predictor may be rounded to the given resolution such that the resulting motion vector is guaranteed to fall on a grid of the given resolution. For each given resolution, the corresponding AmvrShift value in Table 1 below may also be defined to specify the resolution of the motion vector difference with the left shifting operation with AmvrShift-bit. The given motion vector differences, denoted as MvdL0 and MvdL1 in the AMVP mode and MvdCpL0, and MvdCpL1 in the affine AMVP mode, may be modified as follows when the AMVR mode is enabled.

MVs for both reference lists are out of boundary, bi-prediction may not be constrained.

Figure 23:
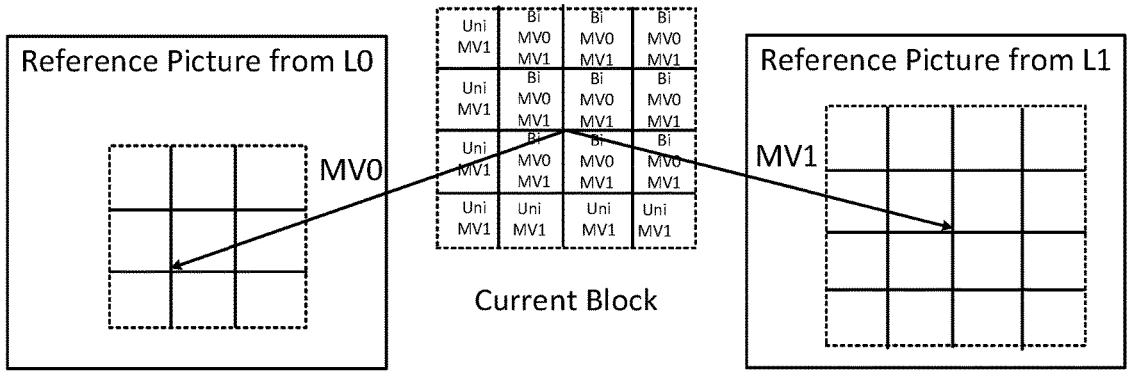
FIG. 23 shows a table to determine the number of shifting bits in some examples.

In some other example implementations, the constraint on bi-prediction may be applied at sub-block level. As depicted in FIG. 23, for each of the N×N sub-blocks within a coding block with inter bi-prediction MVs, if the motion vectors on one of the reference lists is pointing out of the boundary of the reference picture beyond a threshold of M pixels, the sub-block may be changed to a uni-prediction mode, with only the MV on the reference list which is not pointing beyond the out of boundary threshold on the corresponding reference picture.

In some example implementations, the bi-prediction related methods may be disabled or modified when bi-prediction is changed to uni-prediction due to out of bound-

TABLE 1

Specification of AmvrShift in VVC

If inter_affine_flag[ x0 ][ y0 ] is equal to 0, the variables MvdL0[ x0 ][ y0 ][ 0 ], MvdL0[ x0 ][ y0 ][ 1 ],
MvdL1[ x0 ][ y0 ][ 0 ], MvdL1[ x0 ][ y0 ][ 1 ] are modified as follows:
   MvdL0[ x0 ][ y0 ][ 0 ] = MvdL0[ x0 ][ y0 ][ 0 ] << AmvrShift
   MvdL0[ x0 ][ y0 ][ 1 ] = MvdL0[ x0 ][ y0 ][ 1 ] << AmvrShift
   MvdL1[ x0 ][ y0 ][ 0 ] = MvdL1[ x0 ][ y0 ][ 0 ] << AmvrShift
   MvdL1[ x0 ][ y0 ][ 1 ] = MvdL1[ x0 ][ y0 ][ 1 ] << AmvrShift
Otherwise (inter_affine_flag[ x0 ][ y0 ] is equal to 1), the variables MvdCpL0[ x0 ][ y0 ][ 0 ][ 0 ],
MvdCpL0[ x0 ][ y0 ][ 0 ][ 1 ], MvdCpL0[ x0 ][ y0 ][ 1 ][ 0 ] MvdCpL0[ x0 ][ y0 ][ 1 ][ 1 ],
MvdCpL0[ x0 ][ y0 ][ 2 ][ 0 ] and MvdCpL0[ x0 ][ y0 ][ 2 ][ 1 ] are modified as follows:
   MvdCpL0[ x0 ][ y0 ][ 0 ][ 0 ] = MvdCpL0[ x0 ][ y0 ][ 0 ][ 0 ] << AmvrShift
   MvdCpL1[ x0 ][ y0 ] [ 0 ][ 1 ] = MvdCpL1[ x0 ][ y0 ][ 0 ][ 1 ] << AmvrShift
   MvdCpL0[ x0 ][ y0 ][ 1 ][ 0 ] = MvdCpL0[ x0 ][ y0 ][ 1 ][ 0 ] << AmvrShift
   MvdCpL1[ x0 ][ y0 ] [ 1 ][ 1 ] = MvdCpL1[ x0 ][ y0 ][ 1 ][ 1 ] << AmvrShift

| | | | AmvrShift | |
|---|---|---|---|---|
| amvr_ flag | Amvr precision_ idx | inter_affine_flag[ x0 ][ y0 ] = = 1 | CuPredMode [ chType ] [ x0 ][ y0 ] = = MODE_IBC ) | inter_affine_flag[ x0 ] [ y0 ] = =0 && CuPredMode[ chType ] [ x0 ][ y0 ] != MODE_IBC |
| 0 | — | 2 (¼ luma sample) | — | 2 (¼ luma sample) |
| 1 | 0 | 0 (1/16 luma sample) | 4 (1 luma sample) | 3 (½ luma sample) |
| 1 | 1 | 4 (1 luma sample) | 6 (4 luma samples) | 4 (1 luma sample) |
| 1 | 2 | — | — | 6 (4 luma samples) |

In some situations of inter prediction, reference samples used in motion compensation may be out of picture boundary where there are no corresponding reference samples. As such, in some example implementations, some constraints may be applied, particularly in bi-prediction (where reference sample in either one of the reference pictures may be out of picture boundary) when certain reference samples used in motion compensation are out of the picture boundaries.

In some example implementations, when a current pixel with bi-prediction motion vectors has motion vector on one of the two reference lists pointing to a position which is beyond a threshold of distance out of the picture boundary, the motion vector for that reference list may be considered out of boundary, and the inter prediction may be changed to uni-prediction. Only the motion vector for the other reference list which is not out of boundary may be used for the uni-prediction. In some example implementations, when ary conditions. For example, when the bi-prediction restriction is applied and uni-prediction is used, BDOF may be disabled.

Figure 24:
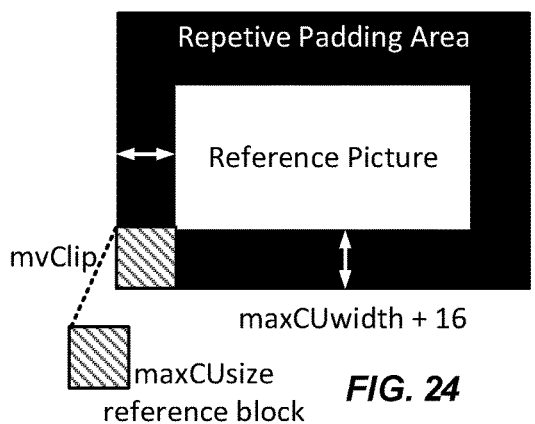
FIGS. 24-25 show diagrams of extended areas of pictures for padding in some examples.

In some example implementation of boundary padding for motion compensation purposes, an extended picture area may be defined as an area surrounding the picture with a predefined or signaled size of, for example, (maxCUwidth+ 16), in each direction of the picture boundary, as illustrated in FIG. 24. For example, the pixel values in the extended area may be derived by repetitive boundary padding. When a reference block is located partially or completely out of the picture boundary (OOB), the repetitive padded pixel in the extended area may be used for motion compensation (MC), as also illustrated in FIG. 24.

Figure 25:
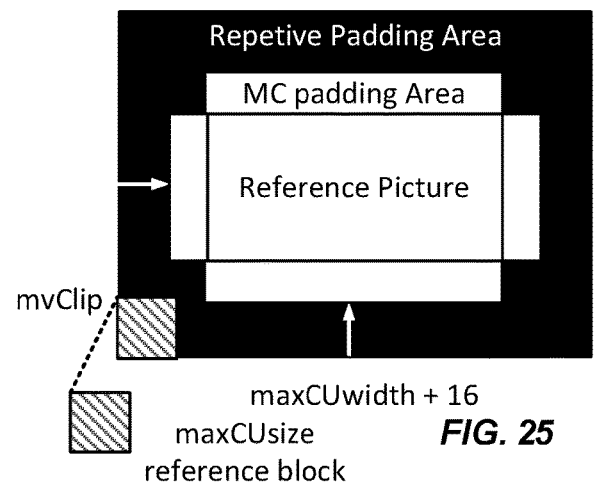

In some further example implementations, samples outside of the picture boundary may be derived by motion compensation instead of by using only repetitive padding. For example, the total padded area size may be further increased by a particular predefined or configurable amount, e.g., 64 pixels, comparing FIG. 24 to keep MV clipping, which implements repetitive padding, non-normative. This example is shown in FIG. 25, where the 64 pixels of increase of the boundary regions are illustrated as "MC padding areas" (or motion compensation padding area) around the "reference Picture". Outside of the increased boundary regions, extended areas of the predefined or signaled size (e.g., (maxCUwidth+16)) may be further configured.

Figure 26:
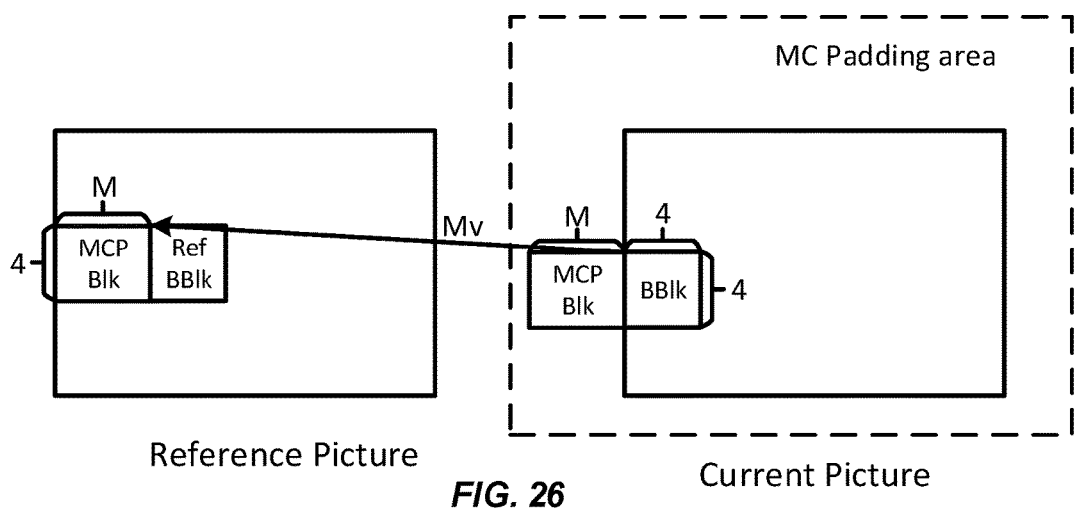
FIG. 26 shows a diagram illustrating motion compensation boundary padding in some examples.

In some example implementations, for motion compensation padding, MV of, e.g., a 4×4 boundary block may be utilized to derive a M×4 or 4×M padding block. The value M may be derived as the distance of the reference block to the picture boundary as shown on FIG. 26. If the boundary block is intra coded, then MV may be considered not available, and M may correspondingly be set equal to 0. If M is less than the example size of 64 above, the rest of the padded area is filled with repetitive padded samples.

In some example implementation and in case of bi-directional inter prediction, only one prediction direction, which has a motion vector pointing to the pixel position farther away from the picture boundary in the reference picture in terms of the padding direction, may be used in MC boundary padding.

In some example implementation, the pixels in the MC padding block may be corrected with an offset, which may be equal to the difference between DC value of the reconstructed boundary block and its corresponding reference block.

In the example boundary padding implementations above, only corresponding boundary block's MV is used for padding. In some situations, there is certain chances that repetitive padding is unnecessarily used instead of motion compensation padding. The additional disclosure below describes various example manners in which the usage of boundary block MV for boundary padding is enhanced for improving inter-prediction coding efficiency. The various example implementations below may be used separately or combined in any order. Further, these implementations may be implemented by processing circuitry (e.g., one or more processors or one or more integrated circuits). In one example, the one or more processors execute a program that is stored in a non-transitory computer-readable medium.

According to some aspects of the disclosure, a simplified skip mode can be used for the motion compensation padding (MCP) blocks. In the simplified skip mode, a block (as a simplified reference to MC padding block) in the MC padding area is predicted according to a motion vector pointing to a reference block in a reference picture.

According to an aspect of the disclosure, the motion information of an MC padding block may be derived from one of multiple neighboring candidates (e.g., N1 multiple neighboring candidates) at the picture boundary. Due to the use of multiple neighboring candidates, the chance of no motion information for motion compensation boundary padding (and hence a reliance on repetitive padding) is reduced.

Figure 27:
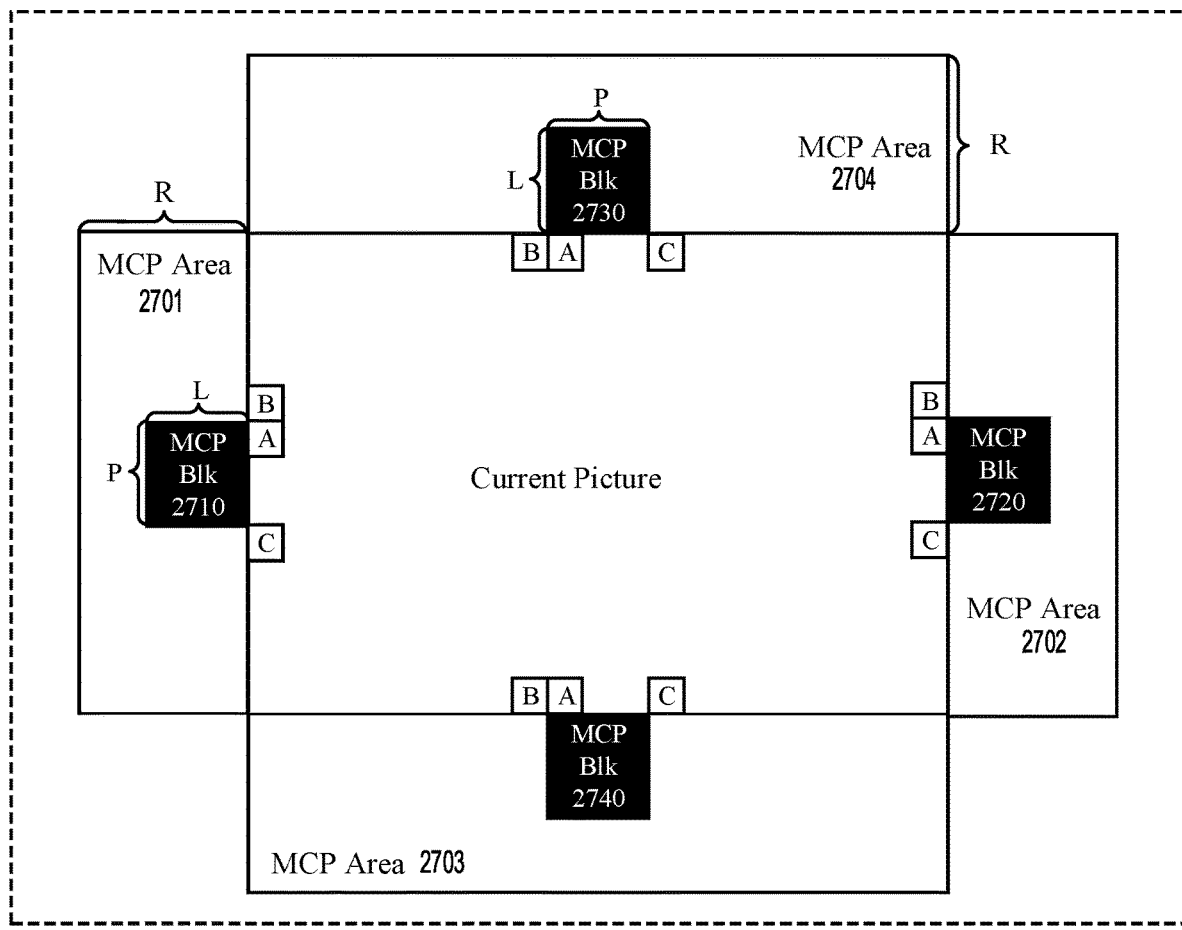

FIG. 27 shows a diagram that illustrates an example of deriving motion information for motion compensation padding (MCP) blocks in some example implementations. In the example of FIG. 27. N1=3 neighboring candidate positions A, B, and C, may be used to derive the motion information for an MCP block (e.g., 2710, 2720, 2730, or 2740).

For example, in FIG. 27, when an MCP block (2710) is at the left side of the vertical picture boundary, the position A may be the right neighboring position, the position B may be the above-right neighboring position, the position C may be the bottom-right neighboring position at the picture boundary. When an MCP block (2720) is at the right side of the vertical picture boundary, the position A may be the left neighboring position, position B may be the above-left neighboring position and position C may be the bottom-left neighboring position at the picture boundary.

Likewise, in FIG. 27, when an MCP block (2730) is at the top of the horizontal picture boundary, the position A is may be the bottom neighboring position, position B is may be the bottom-left neighboring position and position C may be the bottom-right neighboring position at the picture boundary. When an MCP block (2740) is at the bottom side of the horizontal picture boundaries, the position A may be the above neighboring position, position B may be the above-left neighboring position, and position C may be the above-right neighboring position at the picture boundary.

In some example implementations, each candidate position above at the picture boundary corresponding to a block size of N×N. In some examples, N may be equal to 4. In another example, N may be equal to 8.

In some example implementations, the MCP areas of the current picture in FIG. 27 may be defined by four rectangles extended from the picture boundaries. In the example of FIG. 27, the MCP areas may include four rectangles (2701)-(2704). A range parameter R of the rectangles (2701)-(2704) defines luma samples extended from the picture boundary outwards. In an example, R may be equal to 64 luma samples. In another example, R may be equal to the padding range which included both the MC padding area and the repetitive padding area of FIG. 25.

In some example implementations, the MCP block size may be P×L for top/bottom boundaries and L×P for left/right boundaries, as shown in FIG. 27. In an example, where L is equal to MCP range R or the distance of the reference block of the corresponding boundary block in the current picture to reference picture boundary (e.g., similar M of FIG. 26), whichever is smaller. In some examples, P may be a pre-defined size in luma samples. In an example, P is equal to 4. In another example, P is equal to 8.

In some example implementations, the 3 neighboring positions (e.g., A, B and C in FIG. 27) may be checked in an order, e.g., a predefined order, such as A→B→C. The first available candidate in the checking order may be used as a basis for the motion information predictor for the MCP block. Then, motion information may be used for prediction of the MCP block to generate the padded samples in the MCP block.

In some example implementations, a neighboring position that is selected for the prediction of an MCP block may be signaled. In some examples, one bin may be used as candidate index to signal one of the first 2 available neighboring positions (also referred to as neighboring candidates or neighboring candidate positions). In some example implementations, variable length coding may be used to signal one of the 3 available neighboring candidates. In some examples, when there may be only one candidate block having available motion information, the signaling may not be necessary, and the available candidate may be used implicitly. As such, if a decoder determines that motion information is only available for one of these candidates, that candidate is explicitly used without signaling. In some examples, the signaling of all the MCP blocks may be done all at once for the whole frame in a pre-defined order, as further described below.

In some example implementations, the pre-defined order for signaling the candidates used for the MCPs may start from the left MCP block in the top MCP area, following the clockwise direction for all the MCP blocks till the top MCP block in the left MCP area.

Figure 28:
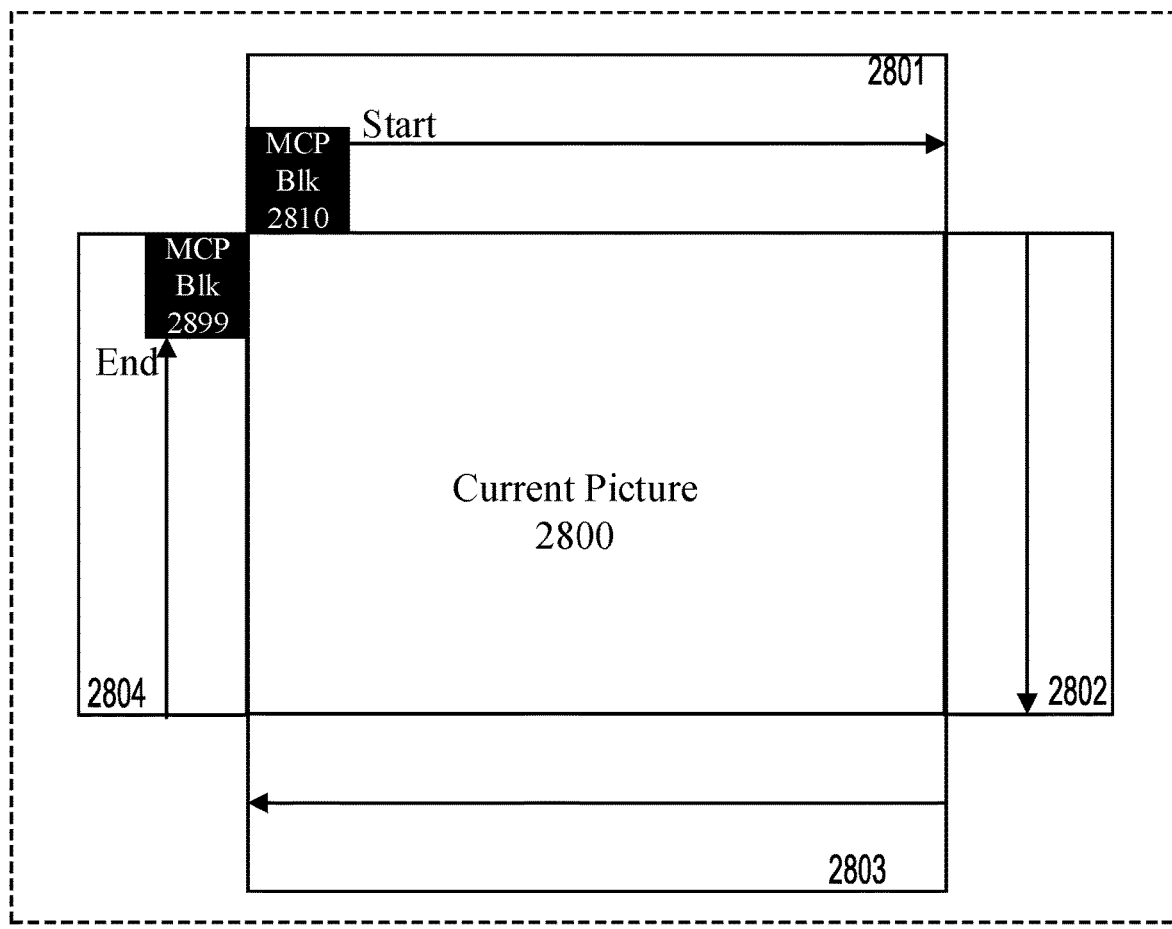
FIG. 28 shows a diagram illustrating an encoding order in some examples.

FIG. 28 shows a picture (2800) with picture boundaries in some example implementations. MCP area (2801)-(2804) extends from the picture boundaries. FIG. 28 also shows a pre-defined order starts from a left MCP block (2810) in the top MCP area (2801), following the clockwise direction for all the MCP blocks till the top MCP block (2899) in the left MCP area (2804), as described above.

In some other example implementations, the pre-defined order may be starting at the top MCP area (2801) from left to right, to the bottom MCP area (2803) from left to right, to the left MCP area (2804) from top to bottom, and finally to the right MCP are (2802) from top to bottom.

In some example implementations, the pixels in an MCP block, when being padded, may be corrected with an offset. The offset can be determined as a difference between the DC values of the reconstructed candidate block (e.g., a candidate block at one of A, B, C position) and the corresponding reference block of the reconstructed candidate block in the reference picture.

According to another aspect of the disclosure, for MCP blocks next to a picture boundary (e.g., a left boundary, a right boundary, an upper boundary, a bottom boundary) of a picture, the motion information may be derived from all the inter minimal blocks (e.g., each 4×4 block) at the picture boundary in the picture. The derivation can follow various manners. For example, the most-used motion information from the inter minimal blocks at the picture boundary may be determined and used for the motion compensation of all the MCP blocks next to the picture boundary.

In some examples, the usage of motion information may be collected from all the inter minimal blocks at the corresponding picture boundary. In some examples, the usage of motion information may be collected from only the inter minimal blocks with reference index of 0 for L0 and/or L1. In an example, the usage of motion information may be collected from only the inter minimal blocks with reference index of 0 for L0. In another example, the usage of motion information is collected from only the inter minimal blocks with reference index of 1 for L1.

According to another aspect of the disclosure, for MCP blocks next to a picture boundary (e.g., a left boundary, a right boundary, an upper boundary, a bottom boundary), the motion information may be derived from all the inter minimal blocks at the corresponding picture boundary. For example, an average motion vector (alternative to most-used motion information) may be determined and used for the motion compensation of all the MCP blocks next to the picture boundary.

In some example implementations, the average of motion vector may be calculated based on all the inter minimal blocks at the corresponding picture boundary. In some example implementations, the average of motion vector may be calculated based on only the inter minimal blocks with reference index of 0 for L0 and/or L1. In an example, average of motion vector is calculated based on only the inter minimal blocks with reference index of 0 for L0. In another example, average of motion vector is calculated based on only the inter minimal blocks with reference index of 1 for L1.

According to an aspect of the disclosure, when a boundary block is intra coded and no motion info is available for related MCP blocks, repetitive padding may be used for the related MCP blocks.

According to an aspect of the disclosure, the motion information of an MCP block may be derived from spatial candidates and temporal candidates, such as one candidate of multiple (e.g., N1) neighboring candidates at the picture boundary and N2 temporally co-located blocks (temporal candidates) of the current block (e.g., current MCP block). Example values of N2 include but not limited to integers such as 1, 2, 3, 4, . . . .

In some example implementations, the N2 temporally co-located blocks refer to N2 sub-blocks located at N2 pre-defined relative positions of a block in one reference picture with the same coordinate of the current block.

Figure 29:
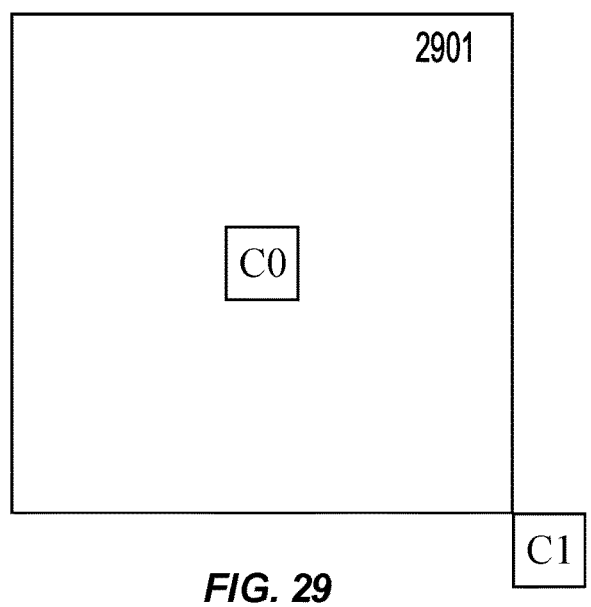
FIG. 29 shows a diagram to illustrate temporally co-located blocks in some examples.

FIG. 29 shows a diagram to illustrate N2=2 temporally co-located blocks in some examples. In FIG. 29, a block (2901) is in a reference picture and at the same coordinates as a current MCP block in the current picture. As an example, the two temporally co-located blocks at pre-defined relative positions are shown as a block or sub-block C0 at the middle position and a block or sub-block C1 at bottom right position.

In some example implementations, both the multiple spatially neighboring blocks (e.g., at the neighboring positions) of an MCP block and N temporally co-located blocks of the MCP block may be scanned, and the multiple spatially neighboring blocks may be checked before the temporally co-located blocks, the first available candidate may be used as the motion information predictor for the MCP block.

According to some aspects of the disclosure, for samples located at the picture boundary in the padding area of the picture, further adjustment on the sample values can be performed. In some examples, the adjustment on the sample values may be based on a deblocking process on the padded samples located at the picture boundary. In some examples, the adjustment on the sample values for the padding may be based on a smoothing filtering process on the padded samples located at the picture boundary.

Figure 30:
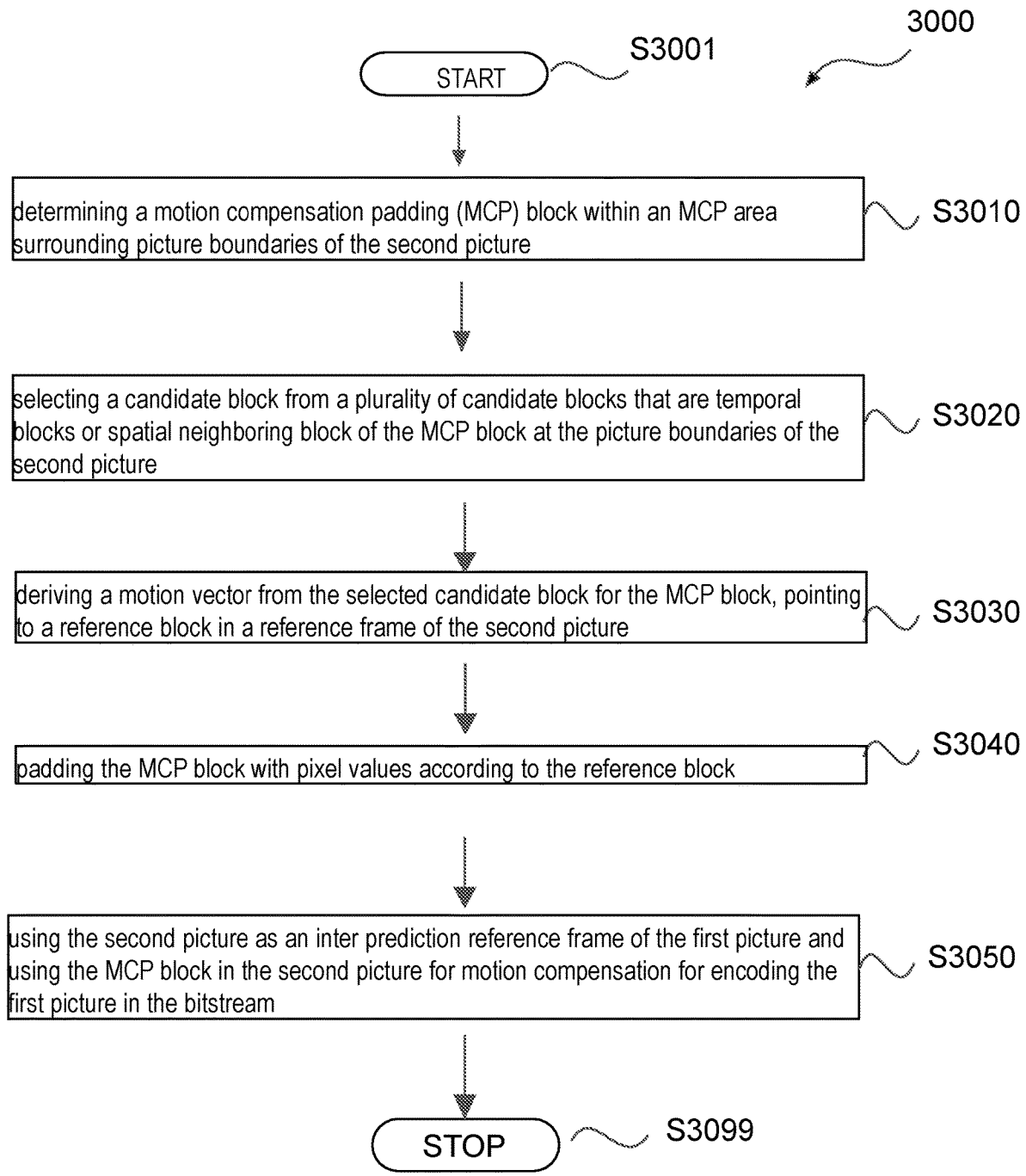
FIG. 30 shows a flow chart outlining a process according to some embodiment of the disclosure.

FIG. 30 illustrates an example logic flow 3000 according the implementations above. The logic flow 3000 starts at S3001. In S3010, a motion compensation padding (MCP) block within an MCP area surrounding picture boundaries of the second picture is determined. In S3020, a candidate block is selected from a plurality of candidate blocks that are temporal blocks or spatial neighboring block of the MCP block at the picture boundaries of the second picture. In S3030, a motion vector is derived from the selected candidate block for the MCP block, pointing to a reference block in a reference frame of the second picture. In S3040, the MCP block is padded with pixel values according to the reference block. In S3050, the second picture is used as an inter prediction reference frame of the first picture and using the MCP block in the second picture for motion compensation for encoding the first picture in the bitstream. The logic flow 3000 stops at S3099.

Figure 31:
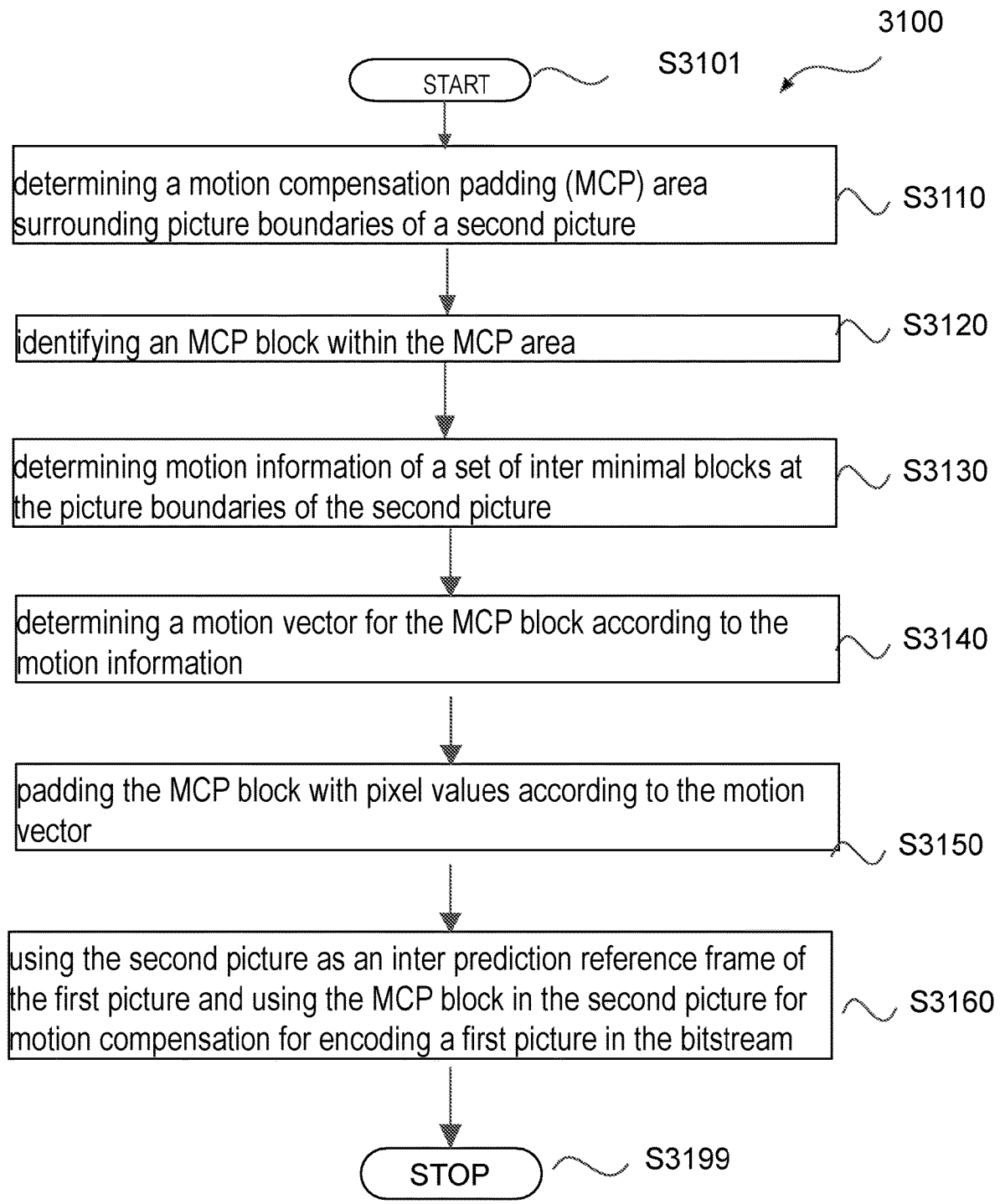
FIG. 31 shows another flow chart outlining a process according to some embodiment of the disclosure.

FIG. 31 illustrates an example logic flow 3100 according the implementations above. The logic flow 3100 starts at S3101. In S3110, a motion compensation padding (MCP) area surrounding picture boundaries of a second picture is determined. In S3120, an MCP block within the MCP area is identified. In S3130, motion information of a set of inter minimal blocks at the picture boundaries of the second picture is determined. In S3140, a motion vector for the MCP block is determined according to the motion information. In S3150, the MCP block is padded with pixel values according to the motion vector. In S3160, the second picture is used as an inter prediction reference frame of the first picture and the MCP block in the second picture is used for motion compensation for encoding the first picture in the bitstream. The logic flow 3100 stops at S3199.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height: width) of the block.

The techniques described above, can be implemented as computer software using computer-readable instructions and physically stored in one or more computer-readable media. For example, FIG. 32 shows a computer system (3200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 32:
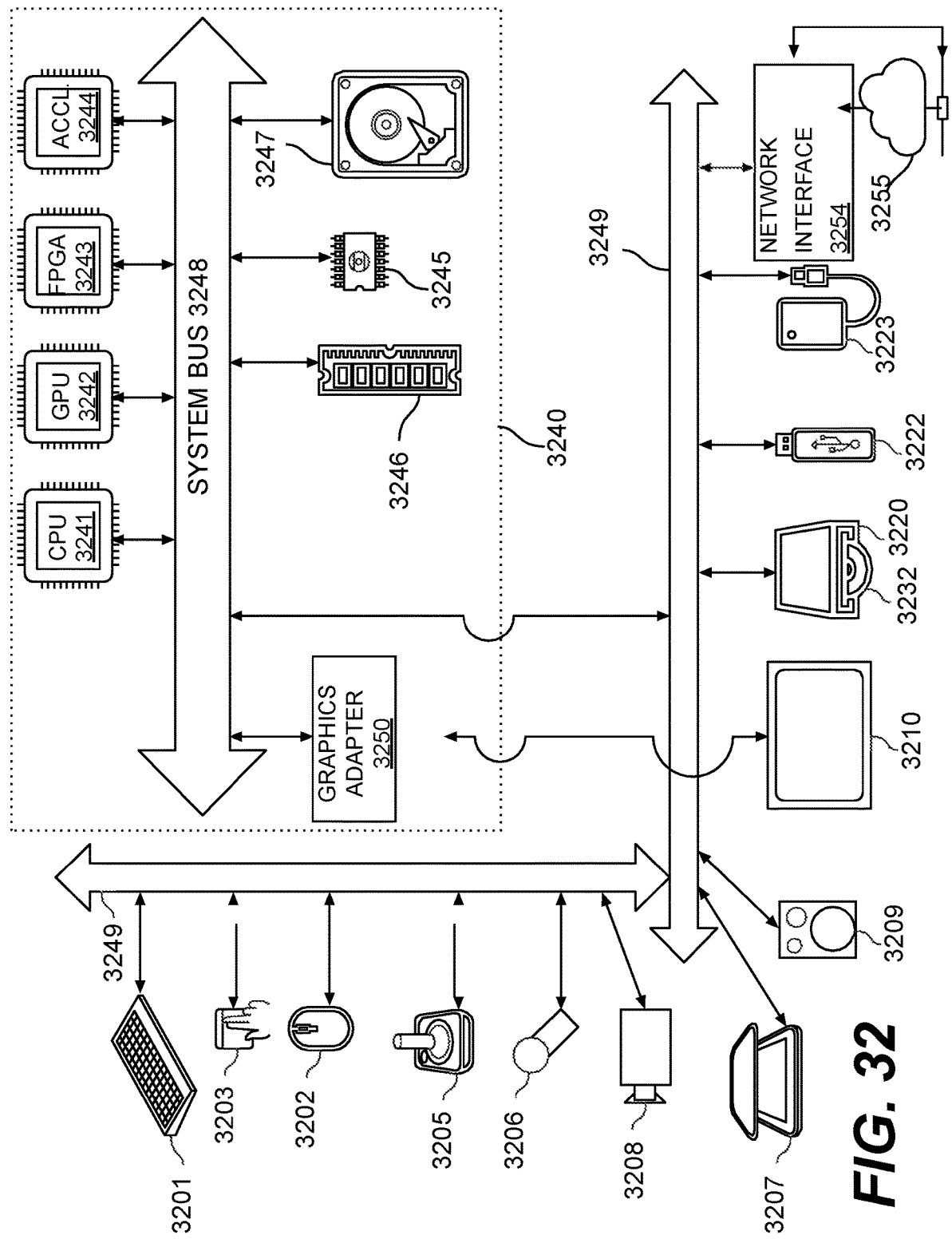
FIG. 32 is a schematic illustration of a computer system in accordance with an embodiment.

The components shown in FIG. 32 for computer system (3200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3200).

Computer system (3200) may include certain human interface input devices. Input human interface devices may include one or more of (only one of each depicted): keyboard (3201), mouse (3202), trackpad (3203), touch screen (3210), data-glove (not shown), joystick (3205), microphone (3206), scanner (3207), camera (3208).

Computer system (3200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3210), data-glove (not shown), or joystick (3205), but there can also be tactile feedback devices that do not serve as input devices), audio output devices (such as: speakers (3209), headphones (not depicted)), visual output devices (such as screens (3210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (3200) can also include human accessible storage devices and their associated media such as optical media including CD/DVD ROM/RW (3220) with CD/DVD or the like media (3221), thumb-drive (3222), removable hard drive or solid state drive (3223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3200) can also include an interface (3254) to one or more communication networks (3255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like. TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (3240) of the computer system (3200).

The core (3240) can include one or more Central Processing Units (CPU) (3241), Graphics Processing Units (GPU) (3242), specialized programmable processing units in the form of Field Programmable Gate Areas (FPGA) (3243), hardware accelerators for certain tasks (3244), graphics adapters (3250), and so forth. These devices, along with Read-only memory (ROM) (3245), Random-access memory (3246), internal mass storage such as internal non-user accessible hard drives, SSDs, and the like (3247), may be connected through a system bus (3248). In some computer systems, the system bus (3248) can be accessible in the form of one or more physical plugs to enable extensions by additional CPUs, GPU, and the like. The peripheral devices can be attached either directly to the core's system bus (3248), or through a peripheral bus (3249). In an example, the screen (3210) can be connected to the graphics adapter (3250). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for encoding a first picture of a video based on a second picture of the video in a bitstream, comprising:

determining a motion compensation padding (MCP) block within an MCP area surrounding picture boundaries of the second picture, wherein the MCP area corresponds to a plurality of rectangles each extended from one of the picture boundaries of the second picture going outwards in units of pixels by an MCP range in a predetermined number of pixels;

selecting a candidate block from a plurality of candidate blocks that are temporal blocks or spatial neighboring block of the MCP block at the picture boundaries of the second picture;

deriving a motion vector from the selected candidate block for the MCP block, pointing to a reference block in a reference frame of the second picture;

padding the MCP block with pixel values according to the reference block; and using the second picture as an inter-prediction reference frame of the first picture and using the MCP block in the second picture for motion compensation for encoding the first picture in the bitstream.

2. The method of claim 1, wherein the plurality of candidate blocks comprise N1 spatially neighboring blocks and N2 temporal blocks of the MCP block, N1 and N2 being positive integers.

3. The method of claim 2, wherein the N2 temporal blocks comprise N2 temporal subblocks located at N2 predefined positions in the reference frame relative to the MCP block.

4. The method of claim 3, wherein N2=2, and the N2 temporal subblocks in the reference frame are co-located with a center subblock and a bottom-right subblock of the MCP block of the second picture.

5. The method of claim 2, wherein the N1 spatially neighboring blocks are scanned before scanning the N2 temporal blocks in order to derive the motion vector for the MCP block of the second picture.

6. The method of claim 5, wherein deriving the motion vector for the MCP block comprises identifying a first candidate block having available motion vector from the plurality of candidate blocks.

7. A method for encoding a first picture of a video based on a second picture of the video in a bitstream, comprising:
determining a motion compensation padding (MCP) block within an MCP area surrounding picture boundaries of the second picture;

selecting a candidate block from a plurality of candidate blocks that are temporal blocks or spatial neighboring block of the MCP block at the picture boundaries of the second picture;

deriving a motion vector from the selected candidate block for the MCP block, pointing to a reference block in a reference frame of the second picture;

padding the MCP block with pixel values according to the reference block; and using the second picture as an inter-prediction reference frame of the first picture and using the MCP block in the second picture for motion compensation for encoding the first picture in the bitstream, wherein an entirety or a subset of the plurality of candidate blocks comprise a set of neighboring blocks of the MCP block in the second picture at a corresponding boundary of the second picture and wherein each of the set of neighboring blocks is of a predetermined block size and the set of neighboring blocks correspond to predetermined relative positions with respect to the MCP block in the second picture.

8. The method of claim 7, wherein deriving the motion vector for the MCP block comprises identifying a first candidate block having available motion vector from the plurality of candidate blocks according to a predetermined scanning order.

9. The method of claim 7, wherein an entirety or a subset of the plurality of candidate blocks further comprises one or more blocks in the reference frame of the second picture that are temporally co-located with a boundary block in the second picture corresponding to the MCP block.

10. The method of claim 9, wherein the one or more blocks in the reference frame of the second picture that are temporally co-located with the boundary block in the second picture corresponding to the MCP block comprise one or more sub-blocks of the boundary block at a predefined set of locations within the boundary block relative to a middle sub-block of the boundary block.

11. The method of claim 10, wherein deriving the motion vector for the MCP block comprises identifying a first candidate block having available motion vector from the plurality of candidate blocks according to a predetermined scanning order, and wherein the set of neighboring blocks are scanned first followed by the one or more blocks that are temporally co-located with the boundary block in the second picture corresponding to the MCP block until the candidate block is identified.

12. The method of claim 1, further comprising signaling the selection of the candidate block from the plurality of candidate blocks in the bitstream.

13. The method of claim 12, wherein one bin of candidate index is used to signal a selection of one of first two candidate blocks of the plurality of candidate blocks.

14. The method of claim 12, wherein a variable length coding is used to signal one of three available candidate blocks of the plurality of candidate blocks.

15. The method of claim 1, wherein when there is only one candidate block among the plurality of candidate blocks with available motion vector, the selection of the candidate block is implicit and is not signaled in the bitstream.

16. The method of claim 1, wherein signaling of candidate block selection for all MCP blocks of the second picture is aggregated in a predetermined MCP block scanning order.

17. The method of claim 1, further comprising:
determining an offset based on first DC values of the selected candidate block and second DC values of a reference block in the reference frame for the candidate block; and applying the offset when padding the MCP block.

18. A method for encoding a first picture of a video based on a second picture of the video in a bitstream, comprising:
determining a motion compensation padding (MCP) area surrounding picture boundaries of the second picture, wherein the MCP area corresponds to a plurality of rectangles each extending from one of the picture boundaries of the second picture going outwards in units of pixels by an MCP range in a predetermined number of pixels;

identifying an MCP block within the MCP area;

determining motion information of a set of inter minimal blocks at the picture boundaries of the second picture;

determining a motion vector for the MCP block according to the motion information;

padding the MCP block with pixel values according to the motion vector; and using the second picture as an inter-prediction reference frame of the first picture and using the MCP block for motion compensation for inter encoding the first picture in the bitstream.

19. A non-transitory computer-readable storage medium storing a video bitstream that is generated by a video encoding method, the video encoding method comprising encoding a first picture of a video based on a second picture of the video by:

determining a motion compensation padding (MCP) block within an MCP area surrounding picture boundaries of the second picture, wherein the MCP area corresponds to a plurality of rectangles each extended from one of the picture boundaries of the second picture going outwards in units of pixels by an MCP range in a predetermined number of pixels;

signaling in the video bitstream a candidate block selected from a plurality of candidate blocks that are temporal blocks or spatial neighboring blocks of the MCP block at the picture boundaries of the second picture;

deriving a motion vector from the selected candidate block for the MCP block, the motion vector pointing to a reference block in a reference frame of the second picture;

padding the MCP block with pixel values according to the reference block; and generating encoded first picture in the video bitstream using the second picture as an inter-prediction reference frame of the first picture and using the MCP block in the second picture for motion compensation.

\* \* \* \* \*